US008402643B2

(12) United States Patent
Sasajima et al.

(10) Patent No.: US 8,402,643 B2

(45) Date of Patent: Mar. 26, 2013

(54) GAS CARTRIDGE LOADING MECHANISM

(75) Inventors: Takeshi Sasajima, Wako (JP); Michihiro Iida, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 312 days.

(21) Appl. No.: 12/907,402

(22) Filed: Oct. 19, 2010

(65) Prior Publication Data

US 2011/0088256 A1 Apr. 21, 2011

(30) Foreign Application Priority Data

Oct. 19, 2009 (JP) ................................ 2009-240825

(51) Int. Cl.

| | |
|---|---|
| ***B23P 19/00*** | (2006.01) |
| ***B23P 19/04*** | (2006.01) |
| ***B23P 21/00*** | (2006.01) |
| ***B25B 27/14*** | (2006.01) |
| ***B23Q 17/00*** | (2006.01) |
| ***B23Q 15/00*** | (2006.01) |
| ***F01M 11/10*** | (2006.01) |
| ***F02B 77/08*** | (2006.01) |

(52) U.S. Cl. . 29/801; 29/407.1; 123/196 S; 123/198 DB

(58) Field of Classification Search .................... 29/255, 29/281.3, 281.5, 407.09, 407.1, 709, 712, 29/801; 123/196 S, 198 DB See application file for complete search history.

(56) References Cited

U.S. PATENT DOCUMENTS

| | | | | |
|---|---|---|---|---|
| 5,070,858 | A * | 12/1991 | Wang | 126/38 |
| 5,162,662 | A * | 11/1992 | Nakayama | 290/1 A |
| 5,799,640 | A * | 9/1998 | Sugimoto et al. | 123/527 |
| 5,890,887 | A * | 4/1999 | Adler | 431/344 |
| 8,074,618 | B2 * | 12/2011 | Kobayashi | 123/195 A |

FOREIGN PATENT DOCUMENTS

| | | | | |
|---|---|---|---|---|
| JP | 8-247467 | A | | 9/1996 |
| JP | 08247467 | A | * | 9/1996 |

* cited by examiner

*Primary Examiner* — David Bryant
*Assistant Examiner* — Jun Yoo
(74) *Attorney, Agent, or Firm* — Westerman, Hattori, Daniels & Adrian, LLP

(57) ABSTRACT

A gas cartridge loading mechanism has a sensor member movable toward a collar retaining portion and mounted to undergo pivotal movement between a locked position and an unlocked position, and a stopper configured to prevent movement of the sensor member when the sensor member is disposed in the locked position and to allow movement of the sensor member when the sensor member is disposed in the unlocked position. The sensor member is configured to move in the locked position when a gas cartridge is set with improper orientation, and to move in the unlocked position when the gas cartridge is set with proper orientation.

4 Claims, 19 Drawing Sheets

GAS CARTRIDGE LOADING MECHANISM

FIELD OF THE INVENTION

The present invention relates to a gas cartridge loading mechanism for loading or attaching connecting collar of a gas cartridge to a collar retaining portion by displacing the gas cartridge toward the collar retaining portion.

BACKGROUND OF THE INVENTION

Gas propellant devices such as gas engines and gas burners include a gas cartridge loading mechanism provided on a loading portion of the body of the gas propellant device for loading a gas cartridge. The gas cartridge loading mechanism has a collar retainer provided on a cartridge accommodating portion, and a positioning lever provided on the collar retainer for assisting visual alignment by the user between a connecting collar of the gas cartridge and the positioning lever so that the gas cartridge can be loaded while keeping correct orientation relative to the collar retainer. More particularly, the connecting collar of the gas cartridge has a notch, which is used for alignment relative to the positioning lever in order to ensure proper loading of the gas cartridge in the cartridge accommodating portion of the gas propellant device.

With the gas cartridge loading mechanism thus constructed, when the gas cartridge is to be loaded on the gas propellant device, the gas cartridge is first placed on the cartridge accommodating portion of the gas propellant device. In this instance, the collar notch of the gas cartridge is disposed relatively far distant from the positioning lever provided on the collar retainer. The collar notch is then brought into alignment with the positioning lever through visual observation by the user and, while keeping the collar notch and the positioning lever in the thus aligned condition, a set lever is operated to displace the gas cartridge toward the collar retainer until the collar of the gas cartridge is retained by the collar retainer. The gas cartridge is thus loaded on the gas propellant device.

One example of such gas cartridge loading mechanisms is disclosed in Japanese Patent No. 2705619 corresponding to JP 08-247467A published on Sep. 27, 1996.

The disclosed gas cartridge loading mechanism is not fully satisfactory in that when the gas cartridge is set in the cartridge accommodating portion, the collar notch of the gas cartridge is disposed relatively far distant from the positioning lever. Furthermore, the positioning lever is disposed inside the cartridge accommodating portion and hence is uneasy to observe from the outside of the gas propellant device. Due to the foregoing difficulties, a visual alignment work made by the user for aligning the collar notch relative to the positioning lever is rendered tedious and time-consuming. Thus the conventional gas cartridge loading mechanism is relatively uneasy to use.

SUMMARY OF THE INVENTION

It is accordingly an object of the present invention to provide a gas cartridge loading mechanism, which is easy to use and able to align a collar notch of a gas cartridge with a predetermined correct orientation to thereby orient the gas cartridge in a desired position without requiring a tedious and time-consuming manual observation work.

According to the present invention, there is provided a gas cartridge loading mechanism for attaching a connecting collar of a gas cartridge to a collar retaining portion by displacing the gas cartridge toward the collar retaining portion, the gas cartridge loading mechanism comprising: a sensor member movable along with the gas cartridge in a direction toward the collar retaining portion, the sensor member being mounted to undergo pivotal movement between a locked position and an unlocked position; and a stopper configured to prevent the sensor member from moving in the direction toward the collar retaining portion beyond the stopper when the sensor member is disposed in the locked position, and to allow the sensor member to move in the direction toward the collar retaining portion beyond the stopper when the sensor member is disposed in the unlocked position. The sensor member is configured to move into the locked position when subjected to a pressure of the connecting collar when the gas cartridge is placed in a setting position with a collar notch in the connecting collar offset from a predetermined correct orientation, and to engage with the collar notch of the connecting collar and stay in the unlocked position when the gas cartridge is placed in the setting position with the collar notch aligned with the predetermined correct orientation.

With this arrangement, when the gas cartridge is properly oriented as it is in the setting position, the sensor member is allowed to engage with the collar notch of the gas cartridge and remain or stay in the unlocked position in which the sensor member is allowed to move toward the collar retaining portion without interference with the stopper, thereby allowing the gas cartridge to move toward the collar retaining portion. With this movement of the gas cartridge, the connecting collar of the gas cartridge is loaded in the collar retaining portion.

By virtue of the fitting engagement between the sensor member and the collar notch, the user can readily confirm without relying on visual observation that the gas cartridge is properly oriented. Furthermore, the collar notch is kept aligned with the predetermined correct orientation as long as it is in engagement with the sensor member. This arrangement ensures that the connecting collar of the gas cartridge can be smoothly loaded in the collar retaining portion with high accuracy.

Alternatively, when the gas cartridge is improperly oriented as it is in the setting position, the sensor member is urged by a pressure of the connecting collar to move into the locked position where the stopper prevents the sensor member from moving toward the collar retaining portion, thereby blocking the gas cartridge from moving toward the collar retaining portion. Thus, loading of the gas cartridge relative to the collar retaining portion is impossible to attain as long as the gas cartridge is improperly oriented with the collar notch offset from the predetermined correct orientation.

Preferably, the sensor member includes a positioning projection configured to fit in the collar notch of the connecting collar when the gas cartridge is placed in the setting position with the collar notch aligned with the predetermined correct orientation, and to engage with the connecting collar and receive the pressure of the connecting collar when the gas cartridge is placed in the setting position with the collar notch offset from the predetermined correct orientation, and a stopper portion configured to assume the unlocked position when the collar notch of the connecting collar is engaged with the positioning projection of the sensor member, and to assume the locked position when the positioning projection is subjected to the pressure of the connecting collar of the gas cartridge.

The sensor member having the positioning projection and the stopper portion is relatively simple in construction and inexpensive to manufacture, which will contribute to a reduction in size and cost of the gas cartridge loading mechanism.

The gas cartridge loading mechanism may further have an anti-rotation prong which is disposed on the collar retaining portion and is receivable in the collar notch of the connecting collar to prevent the gas cartridge from rotating about an axis of the gas cartridge when the connecting collar is attached to the collar retaining portion. By virtue of the anti-rotation prong, the gas cartridge while being attached to the collar retaining portion is able to stay in a properly oriented position.

Preferably, the positioning projection of the sensor member has an engagement groove for receiving therein the anti-rotation prong when the connecting collar is attached to the collar retaining portion.

BRIEF DESCRIPTION OF THE DRAWINGS

One preferred structural embodiment of the present invention will be described in detail below, by way of example only, with reference to the accompanying drawings, in which.

DETAILED DESCRIPTION OF THE PREFERRED EMBODIMENT

Figure 1:
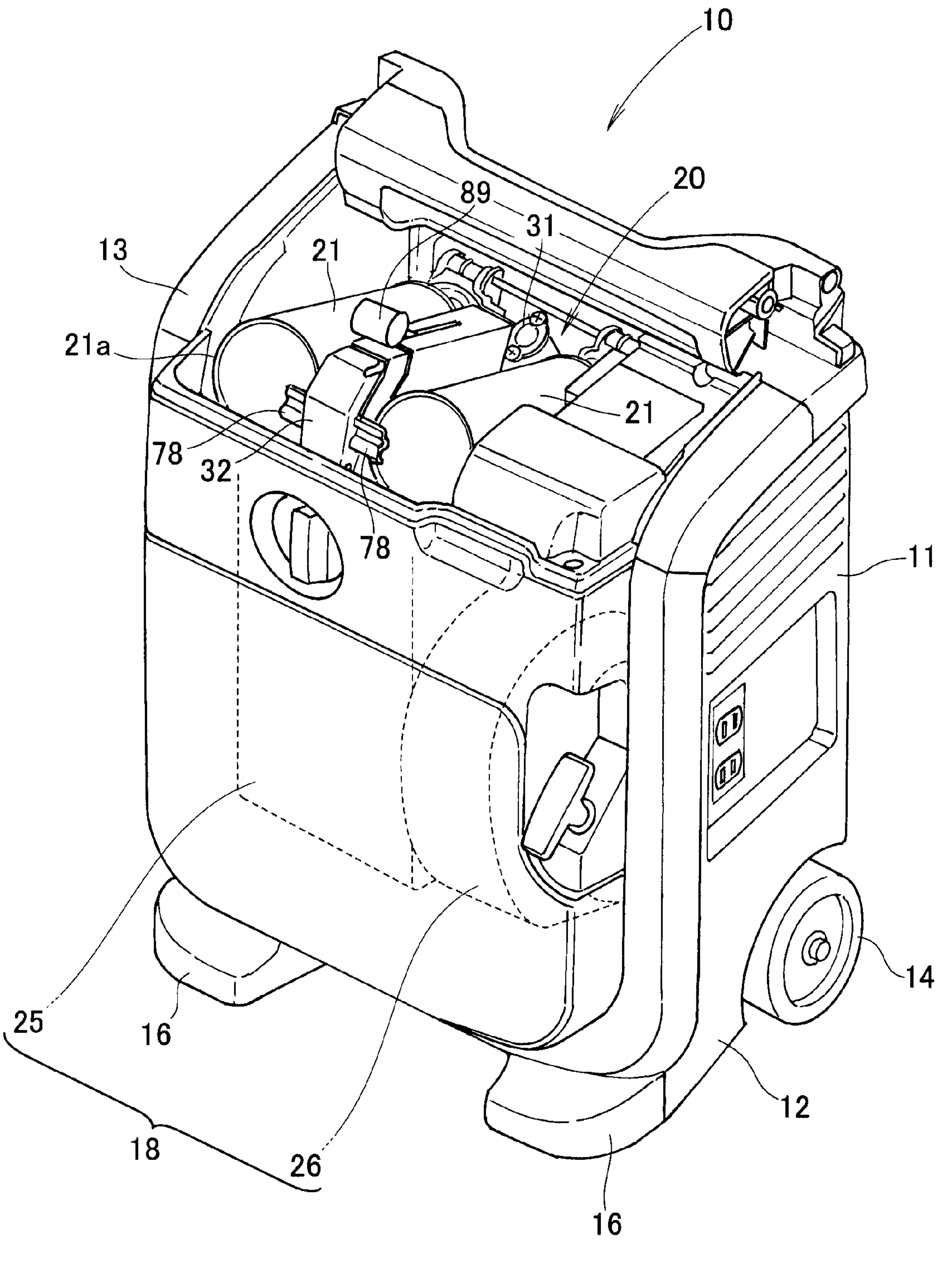
FIG. 1 is a perspective view, with part removed for clarity, of a gas engine-driven portable generator incorporating therein a gas cartridge loading mechanism according to the present invention.

FIG. 1 shows in perspective a gas engine-driven portable generator 10 in which a gas cartridge loading mechanism 20 embodying the invention is incorporated. As shown in this figure, the portable generator 10 generally includes a cubic box-like container or case 11, left and right carrier wheels 14 (only left one being shown) rotatably mounted on a bottom portion 12 of the case 11, left and right legs 16, 16 provided at the bottom portion 12 of the case 11, a combined engine-generator unit 18 installed in the case 11, and the gas cartridge loading mechanism 20 disposed above the engine-generator unit 18. The left and right carrier wheels 14 are located at a rear end of the case 11 and the left and right legs 16 are located at a front end of the case 11, so that the portable generator 10 has a self-supporting structure and can normally remain in its upright operating position shown in FIG. 1. In FIG. 1, the portable generator 10 is shown with its top cover removed for the purpose of illustrating the location of the gas cartridge loading mechanism 20.

As shown in FIG. 1, the gas cartridge loading mechanism 20 is received in an upper mounting portion 13 of the case 11 and disposed above the engine-generator unit 18. The gas cartridge loading mechanism 20 is configured to perform loading and unloading of two gas cartridges 21 at one time relative to a loading portion of the portable generator 10. The engine-generator unit 18 is disposed on a bottom wall of the case 11 and includes an engine 25 and an electric generator 26 driven by the engine 25. The engine 25 and the generator 26 are combined or coupled together into a single unit. The engine 25 is a gas engine drivable with a fuel gas supplied from the gas cartridges 21. While the engine 25 is driving the generator 26, a rotor of the generator 26 continuously rotates around a stator so that the engine-generator unit 18 can generate electric power.

Figure 2:
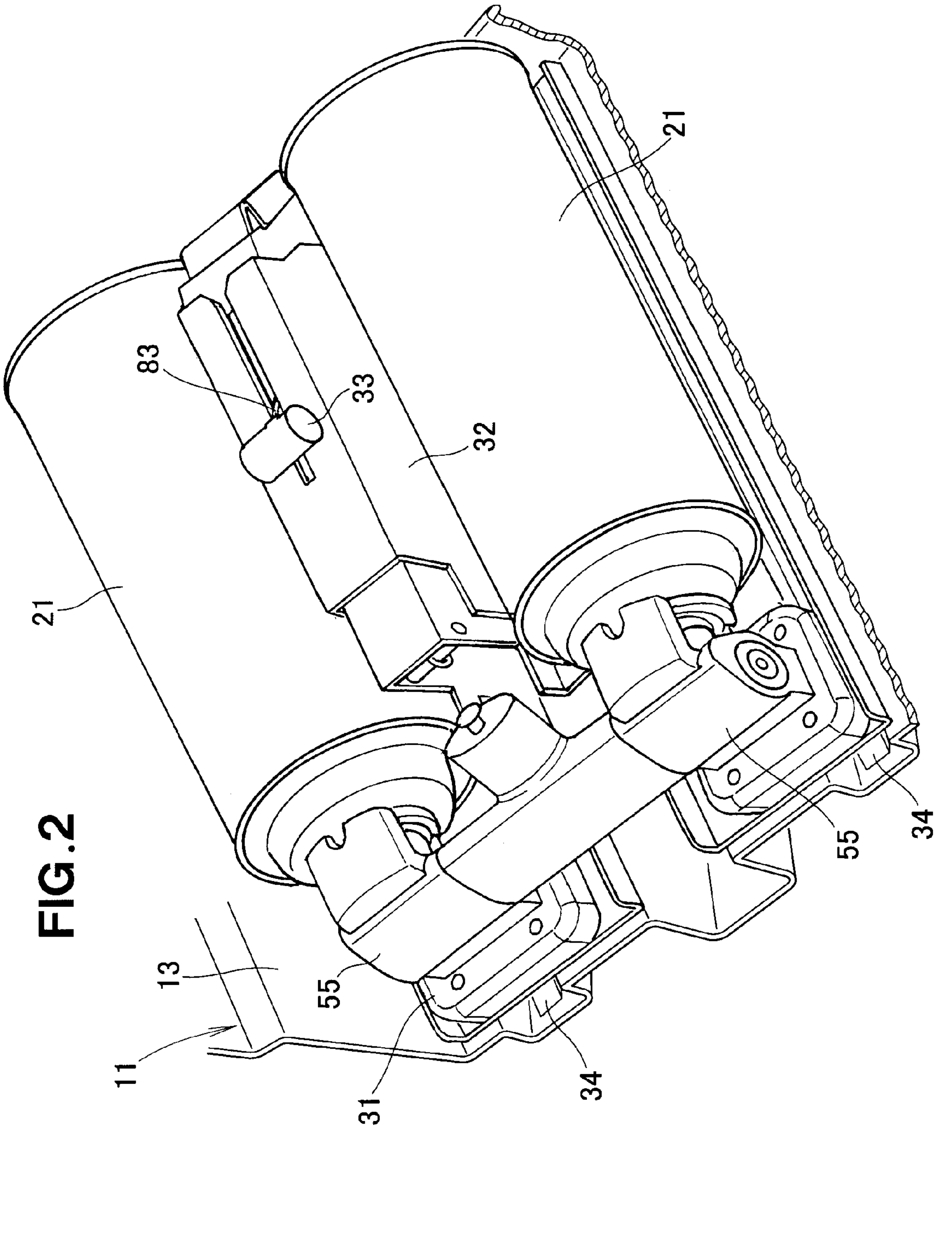
FIG. 2 is a fragmentary perspective view of the gas cartridge loading mechanism shown with two gas cartridges retained in a loaded position.

The gas cartridge loading mechanism 20 will be described in greater detail with reference to FIGS. 2 to 13. As shown in FIG. 2, the gas cartridge loading mechanism 20 includes a base 31 received in the upper mounting portion 13 of the case 11, a slider 32 mounted to undergo sliding movement relative to the base 31, an operation mechanism 33 provided on the slider 32, and a pair of stoppers 34 (also shown in FIGS. 5 and 6) disposed below the base 31 for preventing movement of the slider 32 in one direction (leftward direction in FIG. 2) beyond the stoppers 34.

Figure 5:
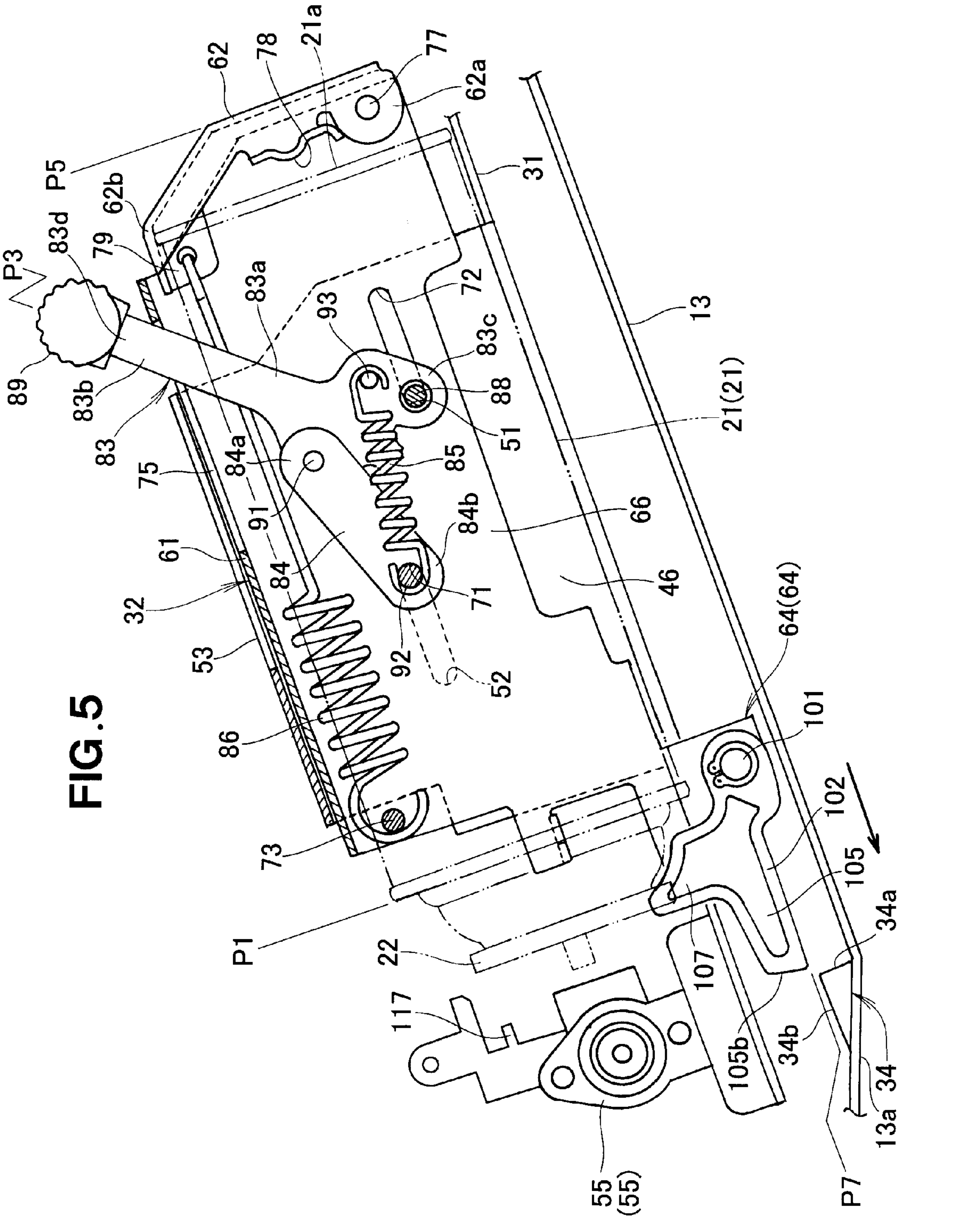
FIG. 5 is a side view, with parts broken away for clarity, of the gas cartridge loading mechanism having an operation lever shown in a releasing position.
Figure 6:
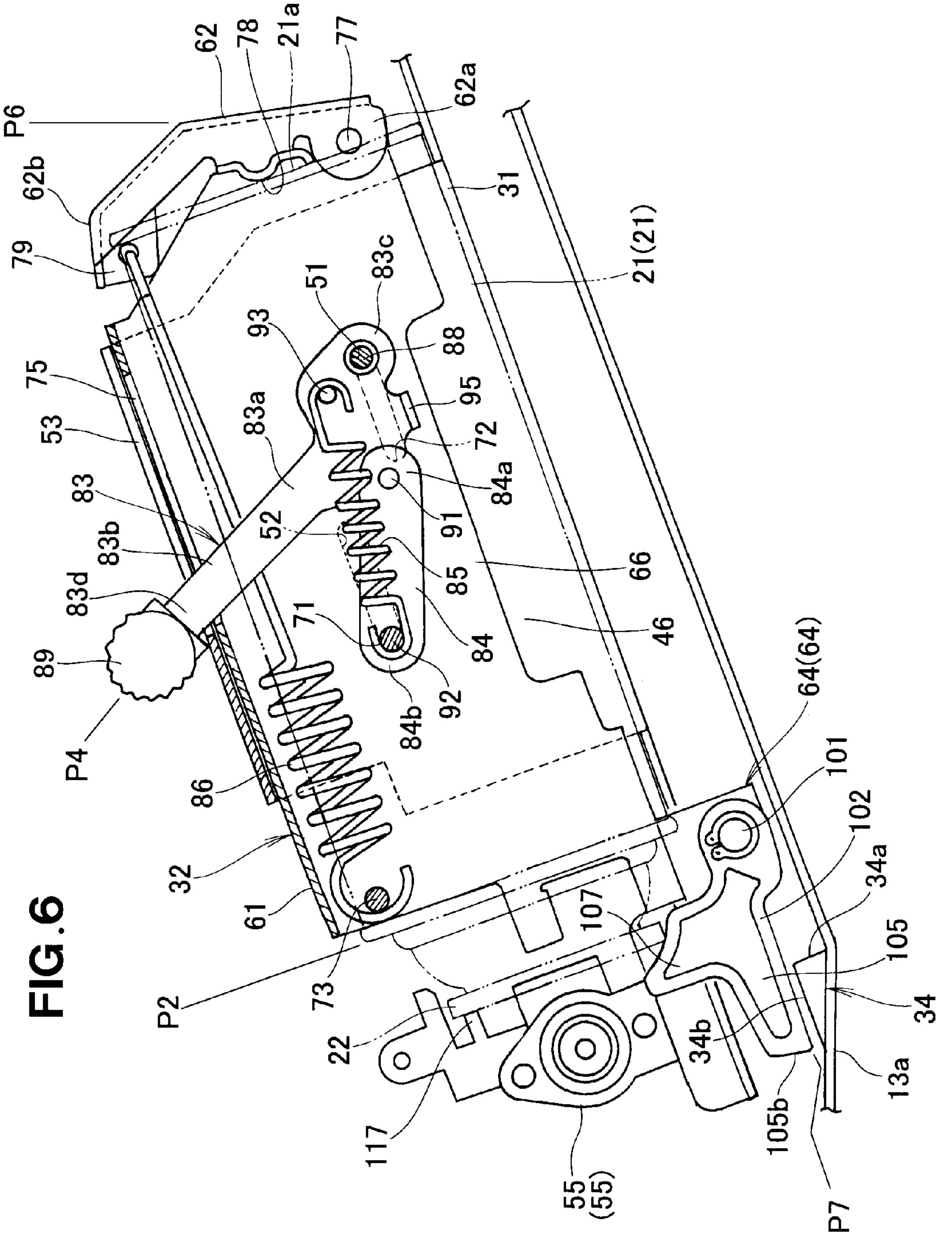
FIG. 6 is a view similar to FIG. 5, but showing the gas cartridge loading mechanism with the operation lever disposed in a loading position.

The gas cartridge loading mechanism 20 is constructed such that the gas cartridges 21, 21, which have been placed in a predetermined initial setting position P1 (FIG. 5) on the base 31, are moved or displaced from the setting position P1 to a loaded position P2 (FIG. 6) and eventually retained in the loaded position P2 by a pair of collar retaining portions 55 of the gas cartridge loading mechanism 20 as the slider 32 undergoes sliding movement relative to the base 31 in response to pivotal movement of an operation lever 83 of the operation mechanism 33 from a releasing position P3 (FIG. 5) to a loading position P4 (FIG. 6).

Figure 3:
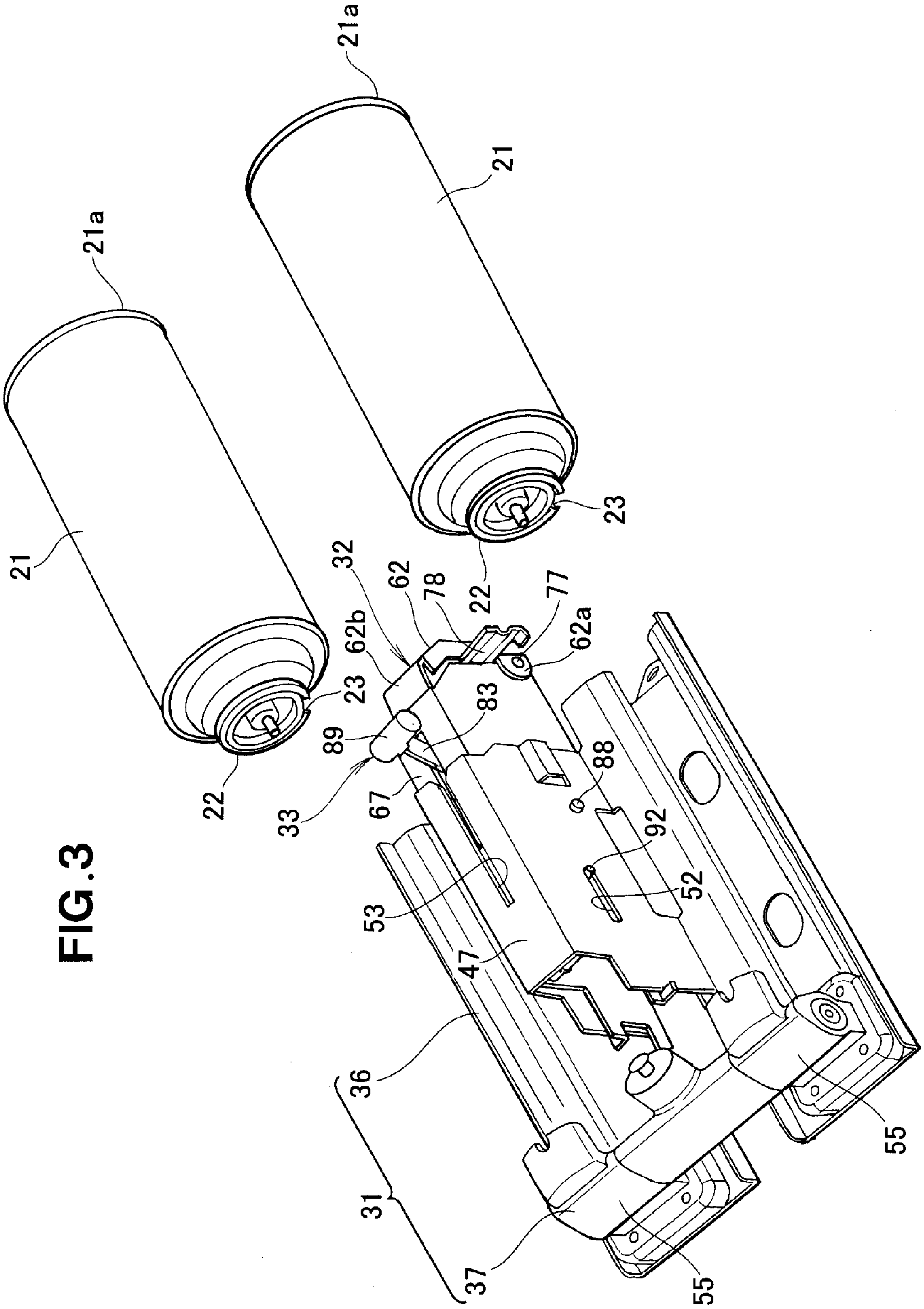
FIG. 3 is a perspective view showing the gas cartridge loading mechanism with the gas cartridges removed therefrom.
Figure 4:
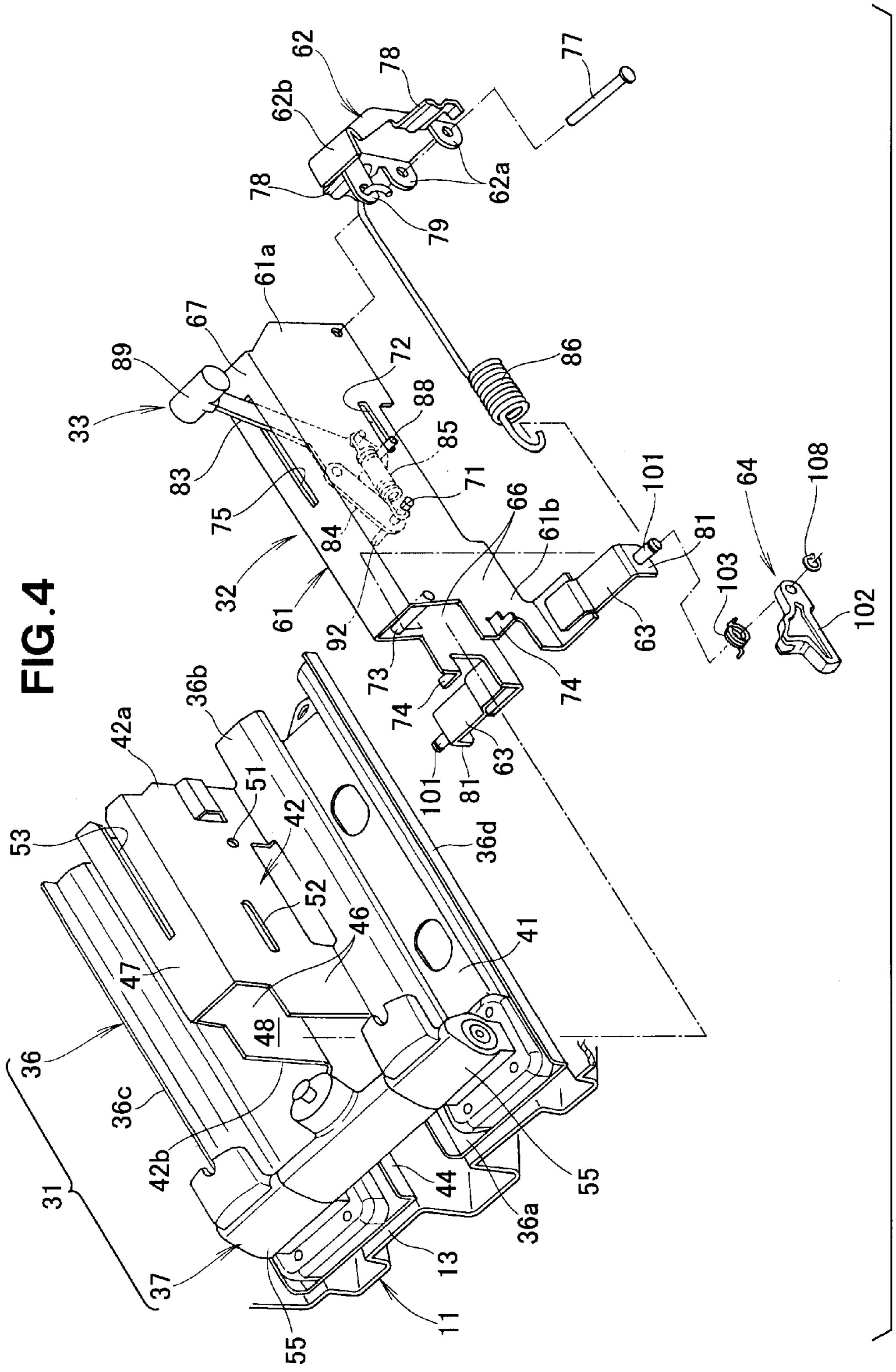
FIG. 4 is an exploded perspective view of the gas cartridge loading mechanism.

As shown in FIGS. 3 and 4, the base 31 includes a base body 36 mounted to the upper mounting portion 13 of the case 11, and a cartridge retainer portion 37 disposed on an attachment end (front end) 36*a* of the base body 36. The base body 36 has a base plate 41 of substantially rectangular configuration having the attachment end (front end) 36*a*, an insertion end (rear end) 36*b*, and right and left sides 36*c* and 36*d*, and a slider guide portion 42 of inverted U-shaped configuration bulged upward from a central portion of the base plate 41. The base plate 41 has a guide channel 44 formed therein to extend along a longitudinal centerline of the base plate 41 between the attachment end (front end) 36*a* and the insertion end (rear end) 36*b* of the base plate 41.

The slider guide portion 42 of inverted U-shaped configuration includes a pair of sidewalls 46 extending vertically upward from opposite edges of the guide channel 44, and a top wall 47 extending between upper edges of the sidewalls 46. The slider guide portion 42 has a guide groove 48 defined by and between the sidewalls 46 and the top wall 47 for slidably receiving therein the slider 32. Each of the sidewalls 46 has a support hole 51 and an elongated guide hole 52 extending in a longitudinal direction of the guide groove 48 for a purpose described later. The top wall 47 has a longitudinal guide groove 53 extending from a rear end 42*a* toward a front end 42*b* of the slider guide portion 42 and terminating short of the front end 42*b* of the slider guide portion 42. The rear end 42*a* of the slider guide portion 42 is located near the insertion end (rear end) 36*b* of the base body 36. The guide groove 53 formed in the top wall 47 of the slider guide portion 42 extends in the longitudinal direction of the guide groove 48 formed in the slider guide portion 42.

As shown in FIG. 4, the cartridge retainer portion 37 is disposed on the attachment end (front end) 36*a* of the base plate 41 and has a pair of laterally spaced collar retaining portions 55, 55 disposed one on each side of the guide channel 44 of the base plate 41 for retaining respective connecting collars 22 (FIG. 3) of the gas cartridges 21. As shown in FIG. 3, each of the connecting collars 22 of the gas cartridges 21 has a cutout recess or notch 23 used for orientation to ensure proper loading or attachment of the gas cartridge 21 relative to the cartridge retainer portion 36, thereby insuring safe and proper supply of the fuel gas from the gas cartridge 21.

The slider 32 includes a slider body 61 slidably received in the guide groove 48 of the slider guide portion 42, a cartridge presser member 62 pivotally mounted on a rear end portion 61*a* of the slider body 61, a pair of wings 63, 63 projecting laterally in opposite directions from a front end portion 61*b* of the slider body 61, and a pair of sensor means or assemblies 64 (one being shown in FIG. 4) pivotally mounted on the wings 63, respectively.

The slider body has a generally inverted U-shaped configuration, and has a pair of sidewalls 66 extending along inside surfaces of the pair of sidewalls 46 of the slider guide portion 42, and a top wall 67 extending between upper edges of the sidewalls 66. Each of the sidewalls 66 has a support hole 71 and an elongated guide hole 72 extending in a longitudinal direction of the slider body 61. The slider body 61 further has a retainer pin 73 located near the front end portion 61*b* thereof and extending between the sidewalls 66, and a pair of stopper lugs 74, 74 disposed on the front end portion 61*b* of the slider body 61 and projecting laterally outwardly from the sidewalls 66 of the slider body 61. The top wall 67 of the slider body 61 has a longitudinal guide groove 75 extending from the rear end portion 61*a* toward the front end portion 61*b* of the slider body 61 for guiding the operation lever 83.

The cartridge presser member 62 is disposed between the sidewalls 66, 66 at the rear end portion 61*a* of the slider body 61 and has a lower end portion 62*a* pivotally connected to the slider body 61 by means of a support pin 77. The cartridge presser member 62 is pivotally movable between a standby position P5 (FIG. 5) and a pressing position P6 (FIG. 6). The cartridge presser member 62 includes a pair of presser lugs 78, 78 projecting laterally outwardly from opposite sides thereof, and a retainer projection 79 protruding from an upper end portion 62*b* of the cartridge presser member 62 toward the front end portion 61*b* of the slider body 61. Each of the laterally projecting wings 63 has a downwardly bent front end portion 81 to which respective one of the sensor assemblies 64 is pivotally mounted. The sensor assembly 64 will be described later in greater detail with reference to FIGS. 7 to 13.

The operation mechanism 33 has the operation lever 88 pivotally mounted on the slider guide portion 42, a driven lever 84 pivotally connected to the operation lever 88, a holding spring 85 for holding the operation lever 83 in the releasing position P3 (FIG. 5) and the loading position P4 (FIG. 6), and a presser spring 86 for urging the presser lugs 78 against bottom walls 21*a* of the gas cartridges 21.

As shown in FIGS. 5 and 6, the operation lever 83 has a lower section 83 received in the slider 32 and an upper section 83*b* projecting upwardly from the slider 32 through the guide groove 75 of the slider 32 and the guide groove 53 of the slider guide portion 42. The operation lever 83 has a lower end portion 83*c* pivotally supported by a pivot pin 88. The pivot pin 88 is rotatably received in the support holes 51 of the sidewalls 46 of the slider guide portion 42 (FIG. 4) and thus supported by the sidewalls 46. The pivot pin 88 is slidably received in the elongated guide holes 72 of the sidewalls 66 of the slider body 61. The operation lever 83 has a knob 89 at an upper end 83*d* thereof for gripping by the user. The lower section 83*a* of the operation lever 83 is pivotally connected by a connecting pin 91 to a first end portion 84*a* of the driven lever 84. The driven lever 84 is received in the slider 32 and has a second end portion 84*b* pivotally supported by a driven pin 92. The driven pin 92 is rotatably received in the support holes 71 of the sidewalls 66 of the slider body 61 and thus supported by the sidewalls 66. The driven pin 92 is slidably received in the elongated guide holes 52 of the sidewalls 46 of the slider guide portion 42 (FIG. 4).

The holding spring 85 is a coiled tension spring connected at opposite ends to the driven pin 92 and a retainer pin 93 provided on the lower section 83*a* of the operation lever 83. When the operation lever 83 is disposed in the releasing position P3 shown in FIG. 5, the holding spring 85 is disposed below the connecting pin 91. In this condition, by a spring force or resiliency of holding spring 85, front ends of the elongated guide holes 72 of the slider 32 are brought into contact with the pivot pin 88, and the driven pin 92 is brought into contact with rear ends of the elongated guide holes 52 of the slider guide portion 42 (FIG. 4). The operation lever 83 has a first stopper 95 (FIG. 6), which is engageable with the driven lever 84 to prevent pivotal movement of the driven lever 84 in the counterclockwise direction in FIG. 5 about the connecting pin 91. Thus, the operation lever 83 and the driven lever 84 are held in the state or relative position shown in FIG. 5 by the force of the holding spring 85, and the operation lever 83 is held in the releasing position P5 shown in FIG. 5.

Alternatively, when the operation lever 83 is disposed in the loading position shown in FIG. 6, the holding spring 85 is disposed above the connecting pin 91. In this condition, rear ends of the elongated guide holes 72 of the slider 32 are in contact with the pivot pin 88 and the driven pin 92 is in contact with front ends of the elongated guide holes 52 of the slider guide portion 42 (FIG. 4). The operation lever 83 has a second stopper (not shown), which is engageable with the driven lever 84 to prevent pivotal movement of the driven lever 84 in the clockwise direction in FIG. 6 about the connecting pin 91. Thus, the operation lever 83 and the driven lever 84 are held in the state or relative position shown in FIG. 6 under the effect of the force of the holding spring 85, and the operation lever 83 is held in the loading position P4 shown in FIG. 6.

The presser spring 86 is a coiled tension sprig connected at opposite ends to the retainer pin 73 on the slider body 61 and the retainer projection 79 on the cartridge presser member 62. When the operation lever 83 is disposed in the releasing position P3 shown in FIG. 5, the cartridge presser member 62 is held in the standby position P5 by a spring force or resiliency of the presser spring 86. The cartridge presser member 62 is normally disposed in the standby position P5 in which the presser lugs 78 of the cartridge presser member 78 allow the gas cartridges 21 to be placed in the setting position P1 shown in FIG. 5 without interference with the gas cartridges 21.

Alternatively, when the operation lever 83 is disposed in the loading position P4 shown in FIG. 6, the cartridge presser member 62 is disposed in the pressing position P6 of FIG. 6 in which the presser lugs 78 of the cartridge presser member 78 are held in pressure contact with the bottom walls 21*a* of the gas cartridges 21 by the spring force of the presser spring 86. The gas cartridges 21 can thus be retained in the loaded position P2 shown in FIG. 6.

Sliding movement of the slider 32 in a forward direction indicated by the arrow shown in FIG. 5, which is caused by the operating mechanism 33, is limited by the stoppers 34 disposed below the base 31 of the gas cartridge loading mechanism 20. The stoppers 34 are formed on the upper mounting portion 13 of the case 10, and the base 31 is disposed in the upper mounting portion 13. The stoppers 34 are disposed below the base 31 (and especially below the pair of collar retaining portions 55). The collar retaining portions 55 are bilaterally symmetrical with each other and only the left collar retaining portion 55 will be described later.

As shown in FIGS. 5 and 6, each of the stoppers 34 is formed on an upwardly sloped part 13*a* of the upper mounting portion 13 and has an end wall 34*a* extending vertically upward from the upper mounting portion 13 and a top wall 34*b* extending substantially parallel to the base 31. The thus formed stopper 34 forms a step on the upwardly sloped part 13*a* of the upper mounting portion 13. The stopper 34 is configured to prevent sliding movement of a sensor member 102 (described later) in a forward direction beyond the stopper 34 when the sensor member 102 is disposed in a locked position P8 (FIG. 13) and to allow sliding movement of the sensor member 102 in the forward direction beyond the stopper 34 when the sensor member 102 is disposed in an unlocked position P7 (FIG. 7).

Figure 7:
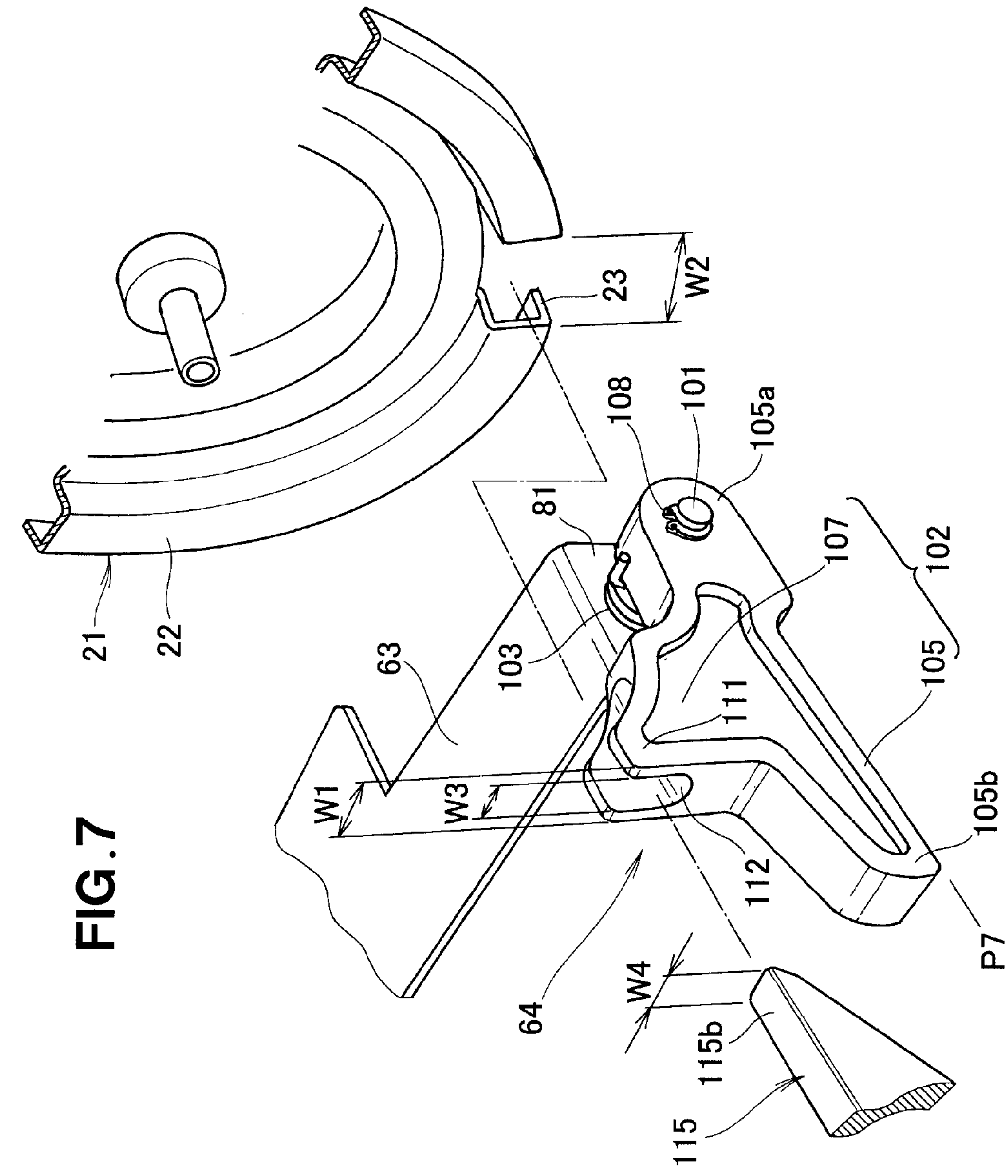
FIG. 7 is a perspective view of a sensor means or assembly of the gas cartridge loading mechanism.
Figure 8:
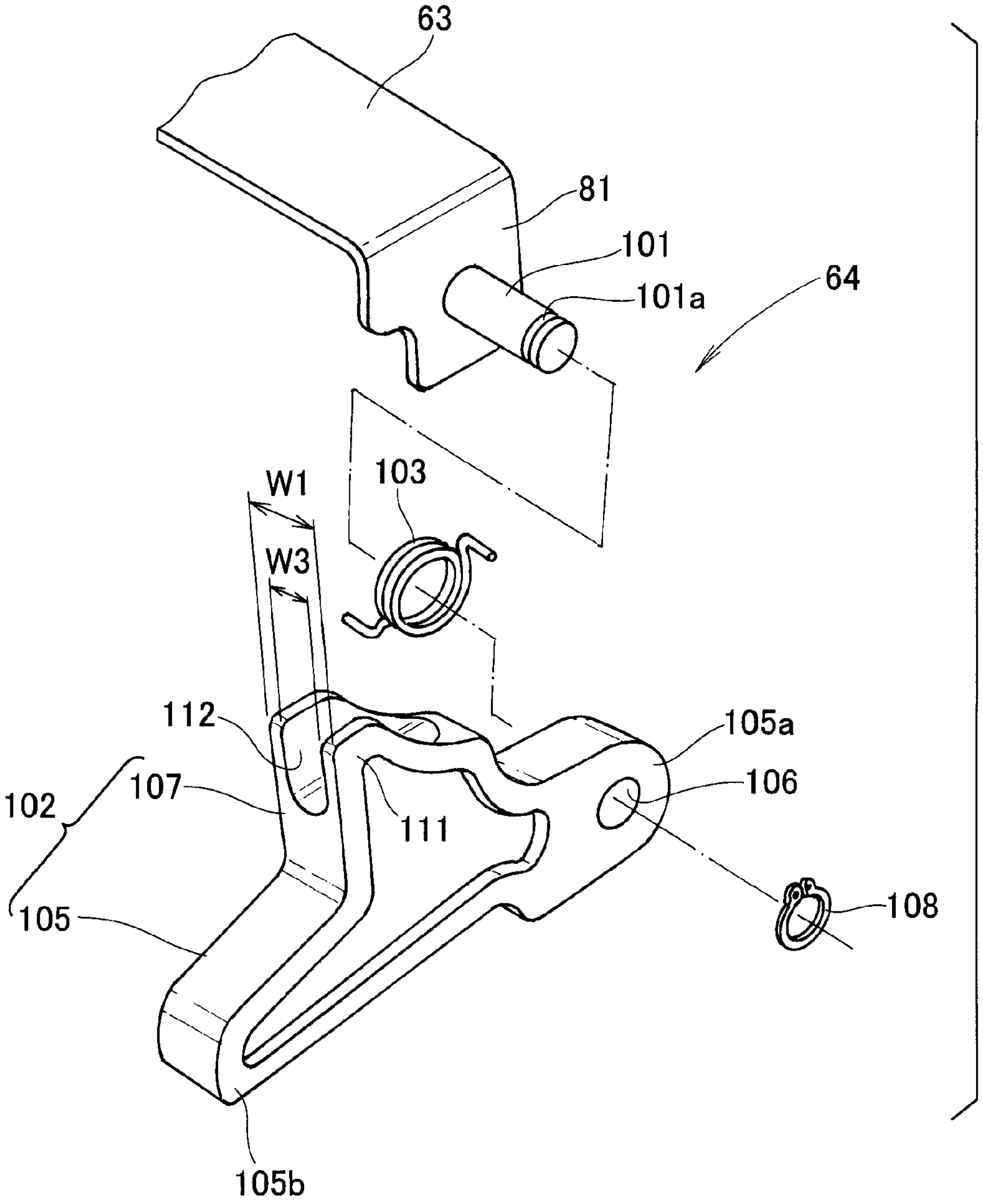
FIG. 8 is an exploded perspective view of the sensor assembly shown in FIG. 7.

As shown in FIGS. 7 and 8, the sensor assembly 64 includes a support pin 101 projecting outwardly from the bent front end portion 81 of the wing 63, the sensor member 102 pivotally mounted on the support pin 101, and a spring member 103 for urging the sensor member 102 toward the unlocked position P7 (FIG. 7). The sensor assembly 64 is able to confirm as to whether or not the gas cartridge 21 is placed or set in the setting position P1 with the collar notch 23 aligned with the predetermined correct orientation.

The sensor member 102 has a generally inverted T-shaped configuration and includes an elongated horizontal part 105, and a vertical part 107 extending upwardly from a longitudinally intermediate portion of the horizontal part 107. The horizontal part 105 has one end portion (pivot end portion) 105*a* pivotally supported on the support pin 101. The pivot end portion 105 has a through-hole 106 slidably fitted with the support pin 101. The sensor member 102 is held in position against removal from the support pin 101 by means of a snap ring 108 fitted in a circumferential groove 101*a* of the support pin 101. Thus, the sensor member 102 is pivotally supported on the support pin 101 and movable to undergo pivotal movement (swinging movement) in a vertical plane about the support pin 101 between the locked position P8 (FIG. 13A) and the unlocked position P7 (FIG. 7).

The sensor member 102 is pivotally mounted on the bent front end portion 81 of the wing 63 via the support pin 101 and, hence, the sensor member 102 of the sensor assembly 64 is movable together with the wing 63 of the slider 32 as the slider 32 undergoes sliding movement relative to the base 31 (FIG. 4) in a direction toward and away from a corresponding one of the collar retaining portions 55 (FIG. 4). Substantially concurrently with this sliding movement of the slider 32, the gas cartridges 21 (FIG. 3) undergo sliding movement toward and away from the corresponding collar retaining portions 55. Since the gas cartridges 21 are movable together with the slider 32, it may be said that each sensor member 102 is movable together with a corresponding one of the gas cartridges 21 in a direction toward a mating one of the collar retaining portions 55.

The sensor member 102 is normally disposed in the unlocked position P7 (FIG. 7) under the effect of a biasing force of the spring member 103. Stated more specifically, the spring member 103 urges the sensor member 102 to turn in a direction toward the unlocked position P7, and upon arrival at the unlocked position P7, the sensor member 102 comes in contact with a stopper (not shown) formed, for example, on the bent front end portion 81 of the wing 63. The sensor member 102 is thus held in the unlocked position P7 by the stopper under the effect of the biasing force of the spring member 103.

When the sensor member 102 is disposed in the unlocked position P7, the horizontal part 105 of the sensor member 102 extends substantially parallel to the top wall 34*b* (FIG. 6) of a corresponding one of the stoppers 34. The horizontal part 105 has a front end portion (hereinafter referred to as "stopper portion") 105*b* at an end opposite to the pivot end portion 105*a*. The vertical part 107 projects upwardly from the longitudinally intermediate portion of the horizontal part 105 toward the mating collar retaining portion 55 (FIGS. 5 and 6) of the cartridge retainer portion 37. The vertical part 107 has a positioning lug or projection 111 at a top end thereof. The positioning projection 111 has a width W1, which is slightly smaller than a width W2 (FIG. 7) of the collar notch 23 of each gas cartridge 21. With the width W1 of the positioning projection 111 thus made smaller than the width W2 of the collar notch 23, the collar notch 23 is allowed to fit with the positioning projection 111 of the sensor member 102.

When the collar notch 23 of the gas cartridge 21 is in fitting engagement with the positioning projection 111 of the sensor member 102, the sensor member 102 can stay in the unlocked position P7 as it is urged toward the unlocked position P7 by the spring member 103. In this instance, the horizontal part 105 of the sensor member 102 is retracted upwardly away from the corresponding stopper 34 (FIGS. 5 and 6) so as not to interfere with the stopper 34.

The sensor member 102 further has an engagement groove 112 formed in the positioning projection 111 of the vertical part 107. The engagement groove 112 extends through the positioning projection 111 in a direction parallel to an axis 24 (FIG. 11) of the gas cartridge 21. The engagement groove 112 has a width W3, which is slightly greater than a width W4 of an anti-rotation prong 115 (FIG. 7) formed on each of the collar retaining portions 55 (FIGS. 4 and 5). With the width W3 of the engagement groove 112 thus made greater than the width W4 of the anti-rotation prong 115, the anti-rotation prong 115 is allowed to fit in the engagement groove 112 of the sensor member 102. The anti-rotation prong 115 is also receivable in the collar notch 23 of the gas cartridge 21 when the collar notch 23 and the positioning projection 111 of the sensor member 102 are fitted with each other.

Figure 9:
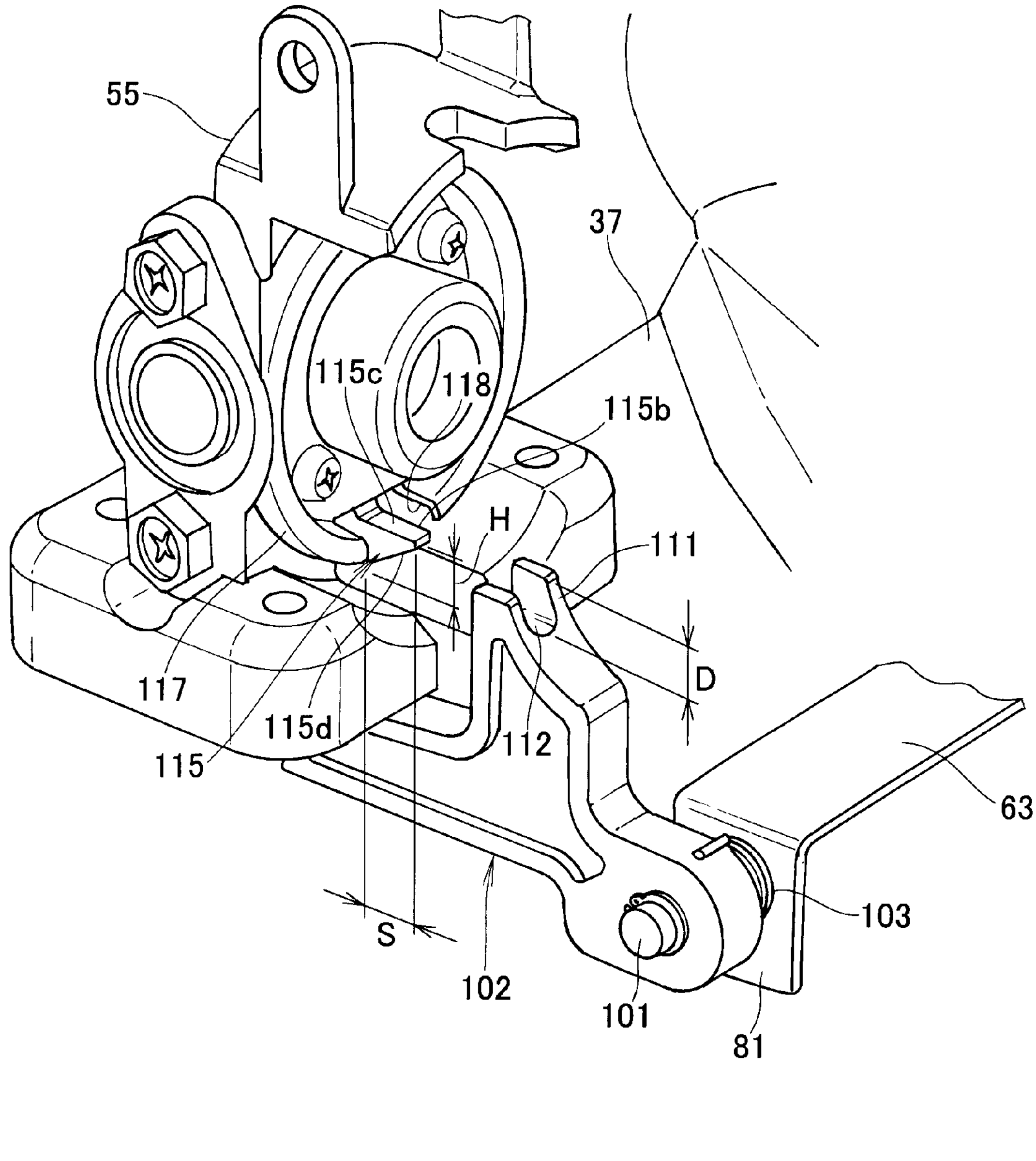
FIG. 9 is a perspective view showing the sensor assembly and an anti-rotation prong in combination before the sensor assembly starts moving in the forward direction.
Figure 10:
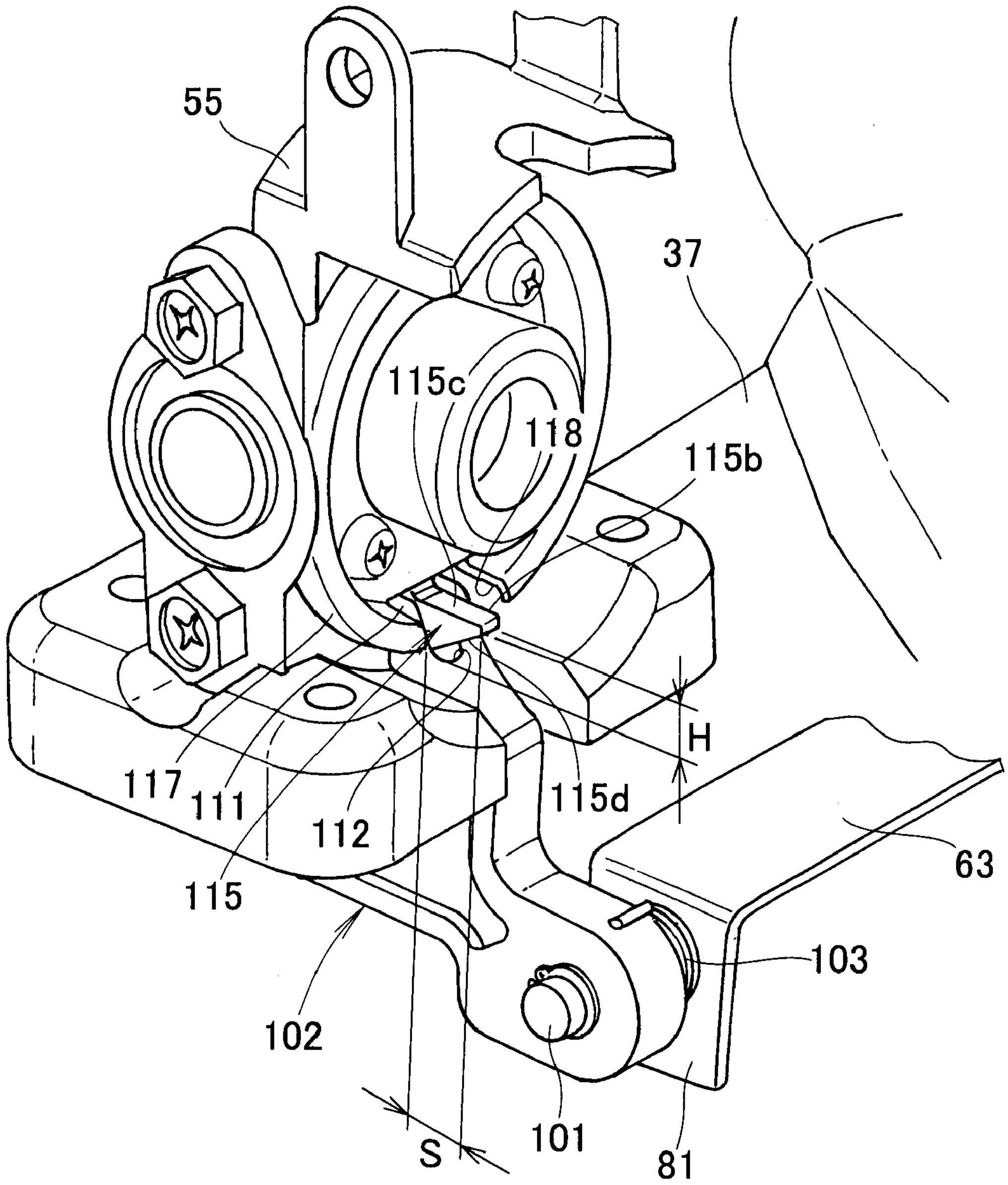
FIG. 10 is a view similar to FIG. 10 but showing the sensor assembly and the anti-rotation prong after the forward movement of the sensor assembly has taken place.

As shown in FIGS. 9 and 10, each of the collar retaining portions 55 has a circular ring-like retainer wall 117, a cutout recess 118 formed in a lower part of the ring-like retaining wall 117, and the anti-rotation prong 115 disposed centrally in the cutout recess 118. The ring-like retainer wall 117 is in abutting engagement with the attachment collar 22 of the mating gas cartridge 21 when the gas cartridge 21 is disposed in the loaded position P2 (FIG. 6). The anti-rotation prong 115 has a base portion 115*a* (FIG. 11) formed integrally with a lower part of the collar retaining portion 55, and a front end portion 115*b* located rearwardly of the ring-like retainer wall 117 as viewed from the gas cartridge 21 (FIG. 11) to such an extent that the anti-rotation prong 115 projects toward the gas cartridge 21 beyond an end face of the ring-like retainer wall 117 by a distance S. The distance S will be hereinafter referred to as a "projecting length" of the anti-rotation prong 115. The anti-rotation prong 115 has an upper surface 115*c* extending substantially horizontally, and a lower surface 115*d* extending obliquely upward from the base portion 115*a* (FIG. 11) toward the front end portion 115*b* so that the anti-rotation prong 115 is tapered from the base portion 115*a* toward the front end portion 115*b* thereof. The anti-rotation prong 115 has a maximum height H, which is smaller than a depth D (FIG. 9) of the engagement groove 112 of the sensor member 102 so that the anti-rotation prong 115 can be fully received in the engagement groove 112.

With this arrangement, as the gas cartridges 21 are displaced from the setting position P1 (FIG. 5) to the loaded position P2 (FIG. 6) in response to sliding movement of the slider 32, the sensor members 102 (only one being shown) are allowed to move together with the slider 32 in a direction toward the collar retaining portions 55 while the engagement groove 112 of each sensor member 102 is fitted with the anti-rotation prong 115 of a corresponding one of the collar retaining portions 55. When the gas cartridges 21 are disposed in the loaded position P2, the front end portion 115*b* of the anti-rotation prong 115 projects from a rear end (right end in FIGS. 9 and 10) of the engagement groove 112 of the positioning projection 111. The thus projecting front end portion 115*b* of the anti-rotation prong 115 is received in the collar notch 23 (FIG. 7) of the mating gas cartridge 21. Thus, the anti-rotation prong 115 is a protrusion, which is disposed on a lower par of each of the collar retaining portions 55, which is engageable with the engagement groove 112 of the positioning projection 111 of the sensor member 102, and which is receivable in the collar notch 23 of the mating gas cartridge 21 (FIG. 7).

Figure 11A:
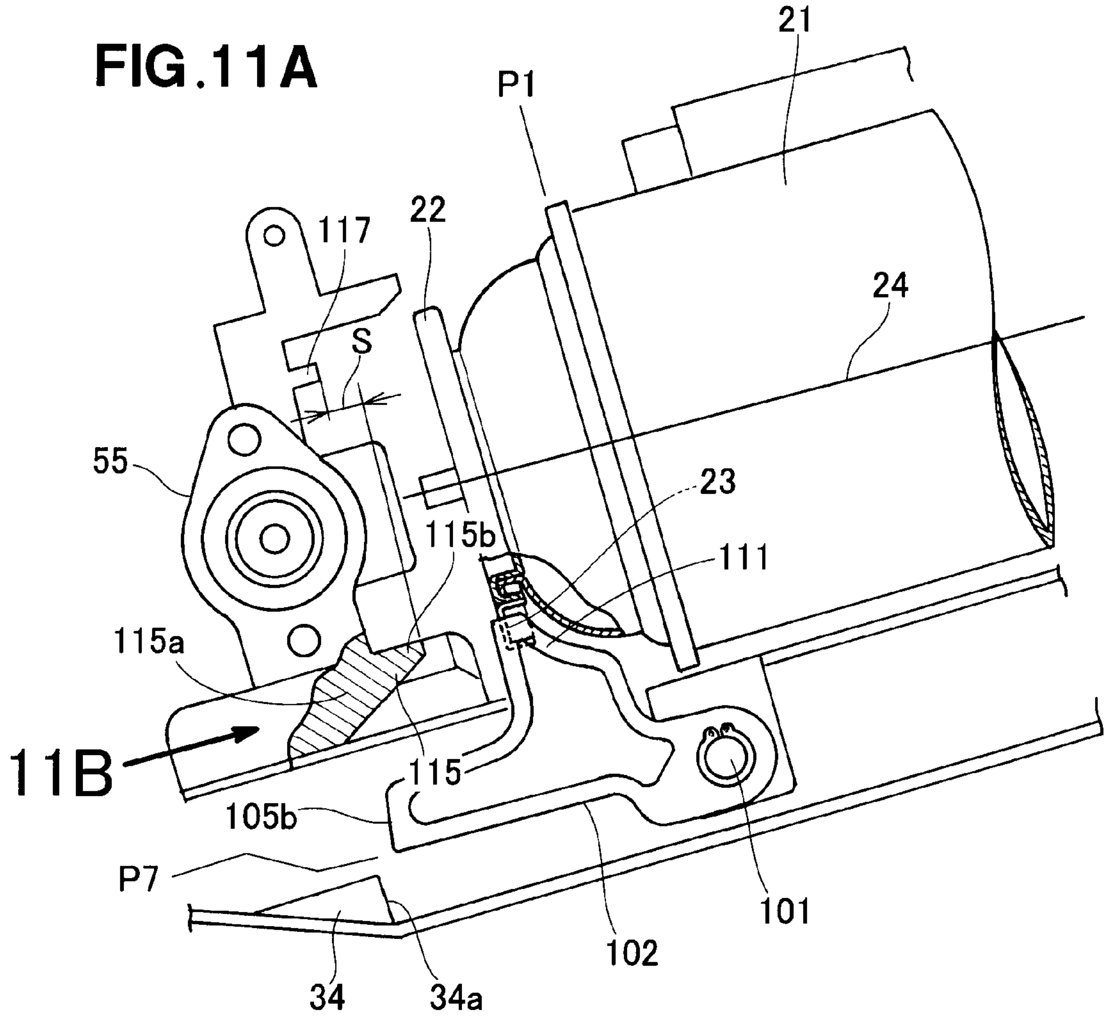
FIG. 11A is a side view illustrative of a condition in which the gas cartridge is placed in a setting position with a collar notch aligned with a predetermined correct orientation.
Figure 11B:
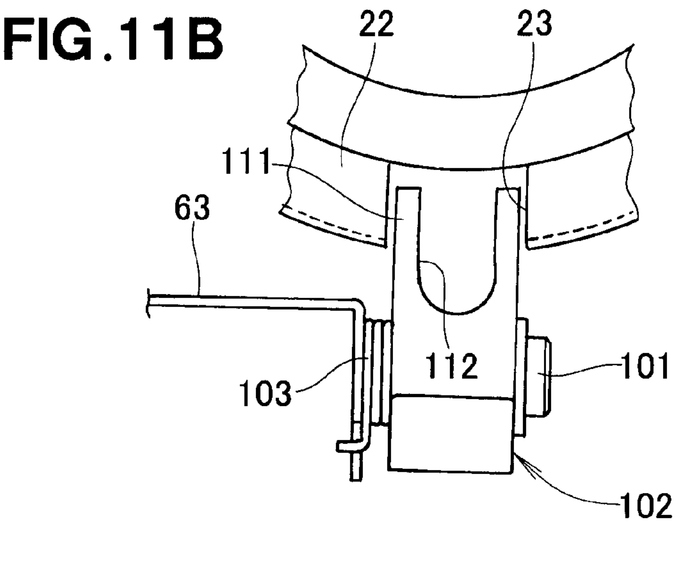
FIG. 11B is a view in the direction of arrow 11*b* in FIG. 11A.

As shown in FIGS. 11A and 11B, when each of the gas cartridges 21 is placed or set in the setting position P1 with the collar notch 23 aligned with the predetermined correct orientation, the positioning projection 111 of a corresponding one of the sensor members 102 engages with the collar notch 23 of the gas cartridge 21. In this instance, the sensor member 102 is allowed to stay in the unlocked position P7 (FIG. 11A) with the stopper portion 105*b* disposed in a position upwardly offset from the stopper 34 and held out of interference with the end wall 34*a* of the stopper 34. It may be said that the stopper portion 105*b* of the sensor member 102 is disposed to assume the unlocked position P7 of the sensor member 102 when the collar notch 23 of the gas cartridge 21 is engaged with the positioning projection 111 of the sensor member 102. It will be appreciated that the sensor member 102 is configured to engage with the collar notch 23 of the gas cartridge 21 and remain in the unlocked position P7 when the gas cartridge 21 is placed in the setting position P1 with the collar notch 23 aligned with the predetermined correct orientation.

Furthermore, since the collar notch 23 of the gas cartridge 21 is engaged with the positioning projection 111 of the sensor member 102, the gas cartridge 21 is prevented from rotating about the axis 24 of the gas cartridge 21. The gas cartridge 21 can thus be retained in the setting position P1 with the collar notch 23 aligned with the predetermined correct orientation. By virtue of the sensor member 102 having the positioning projection 111 configured to engage with the collar notch 23 of the gas cartridge 21 when the gas cartridge 21 is placed in the setting position P1 with the collar notch 23 aligned with the predetermined correct orientation, the user can readily confirm that the gas cartridge 21 is placed in the setting position P1 with the collar notch 23 kept aligned with the predetermined correct orientation. Additionally, because the stop portion 105*b* of the sensor member 102 is disposed in a position upwardly offset from the stopper 34 and held out of interference with the end wall 34*a* of the stopper 34, the sensor member 102 is allowed to move in a forward direction (leftward direction in FIG. 11A) beyond the end wall 34*a* of the stopper 34 as the gas cartridge 21 is displaced from the setting position P1 toward the loaded position P2 (FIG. 12A) in conjunction with sliding movement of the slider 32.

Figure 12A:
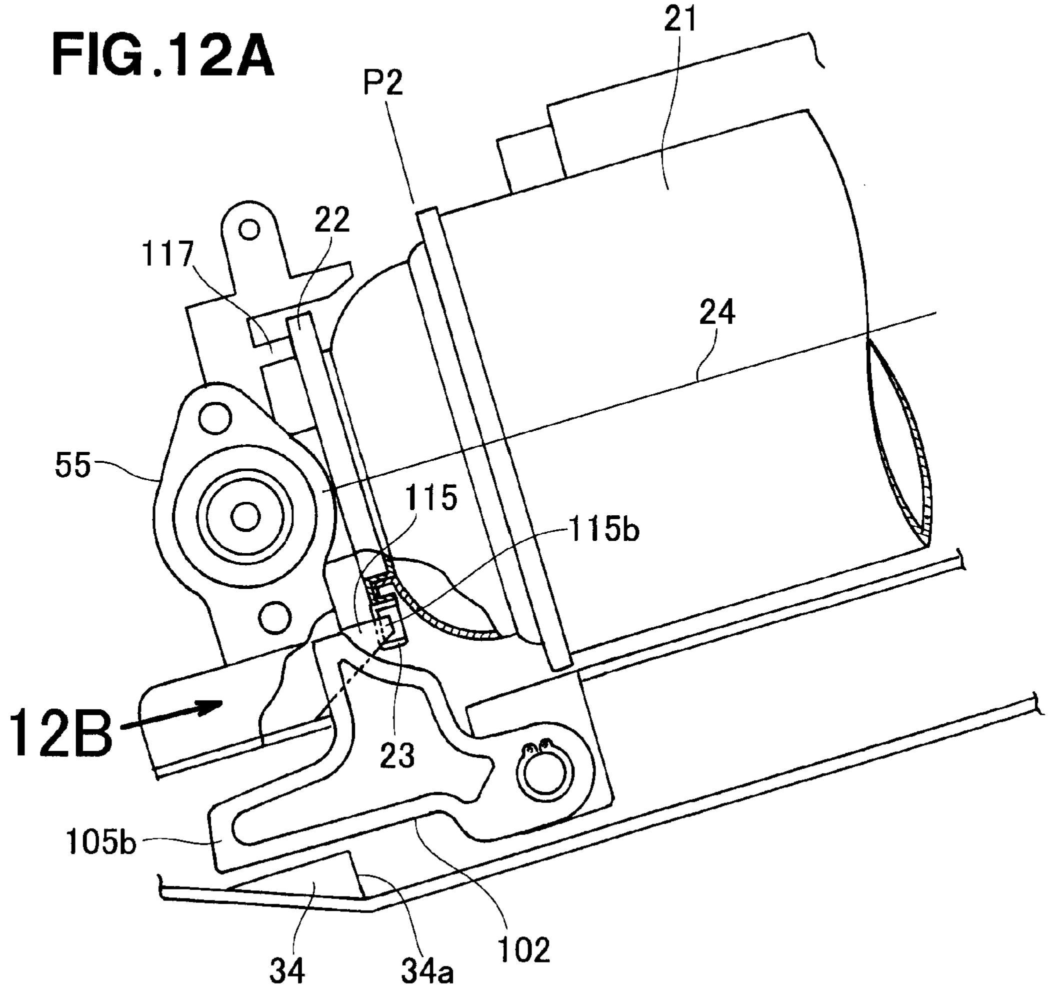
FIG. 12A is a side view illustrative of a condition in which the gas cartridge is retained in a loaded position with the collar notch aligned with the predetermined correct orientation.
Figure 12B:
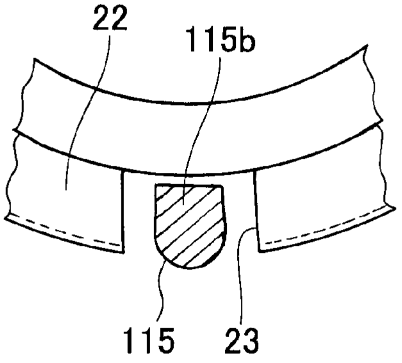
FIG. 12B is a view in the direction of arrow 12*b* in FIG. 12A.

As shown in FIGS. 12A and 12B, when the gas cartridge 21 is disposed in the loaded position P2 (FIG. 12A), the front end portion 115*b* of the anti-rotation prong 115 is received in the collar notch 23 of the gas cartridge 21. With this arrangement, the gas cartridge 21 is prevented from rotating about the axis 24 of the gas cartridge 21. In the loaded condition of the gas cartridge 21 relative to the collar retaining portion 55, the gas cartridge 21 can thus be retained in the loaded position P2 with the collar notch 23 aligned with the predetermined correct orientation.

As described above with reference to FIGS. 11A through 12B, the sensor member 102 has the positioning projection 111 and the stopper portion 105*b*. When the gas cartridge 21 is placed in the setting position P1 with the collar notch 23 aligned with the predetermined correct orientation, the collar notch 23 is engaged with the positioning projection 111 of the sensor member 102, and the sensor member 102 is allowed to stay in the unlocked position P7 where the stopper portion 105*b* is held out of interference with the stopper 34. The gas cartridge 21 can thus be loaded in or attached to the collar retaining portion 55 with the collar notch 23 aligned with the predetermined correct orientation. By virtue of the fitting engagement between the positioning projection 111 and the collar notch 23, the user can readily confirm without relying on tedious visual observation that the gas cartridge 21 currently loaded in or attached to the collar retaining portion 55 has the collar notch 23 aligned with the predetermined correct orientation.

Figure 13A:
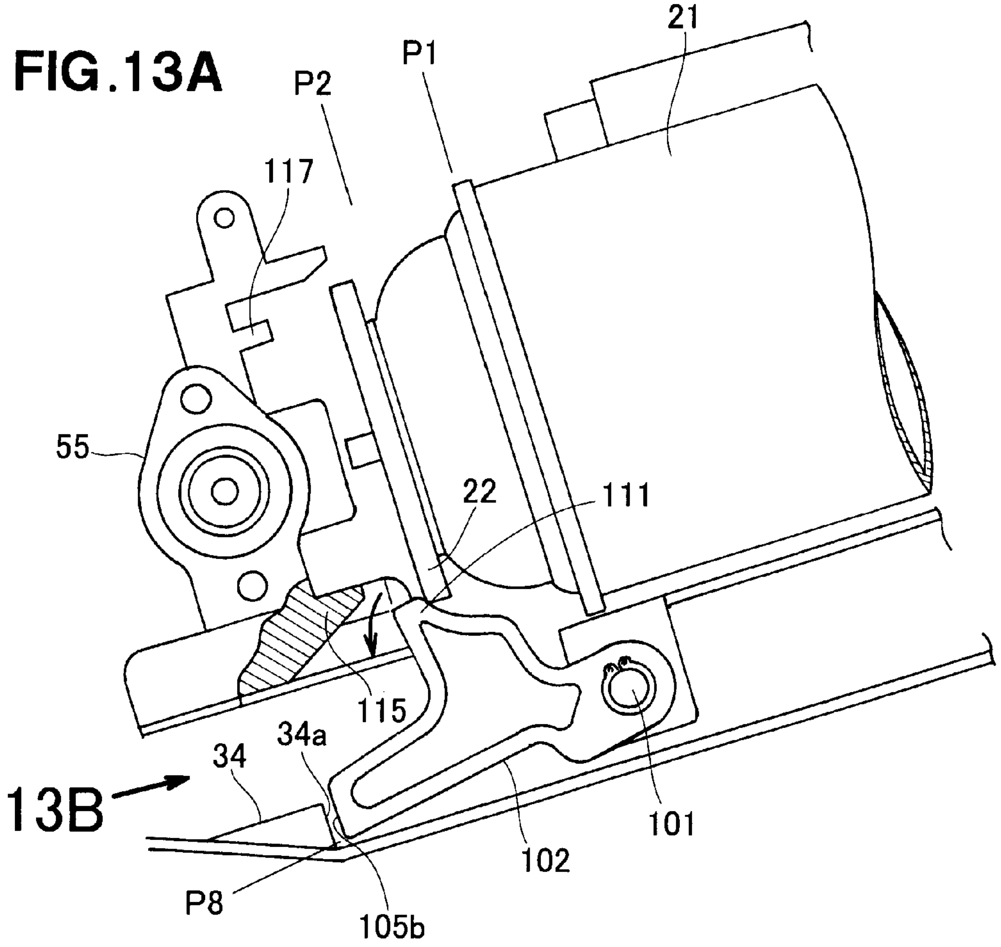
FIG. 13A is a side view illustrative of a condition in which the gas cartridge is placed in the setting position with the collar notch offset from the predetermined correct orientation.
Figure 13B:
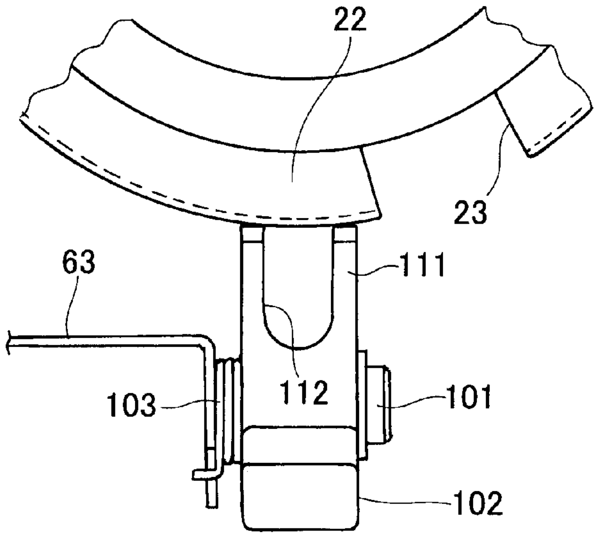
FIG. 13B is a view in the direction of arrow 13*b* in FIG. 13A.

As shown in FIGS. 13A and 13B, it may occur that the gas cartridge 21 is placed or set in the setting position P1 with the collar notch 23 offset from the predetermined correct orientation. In this instance, the positioning projection 111 of the sensor member 102 is first brought into contact with the connecting collar 22 of the gas cartridge 21 and then subjected to a downward pressure applied from the connecting collar 22 of the gas cartridge 21. By the effect of the downward pressure applied to the positioning projection 111, the sensor member 102 is urged to turn counterclockwise about the support pin 101 and moves into the locked position P8 (FIG. 13A) where the stop portion 105*b* of the sensor member 102 can interfere with the end wall 34*a* (FIG. 13A) of the stopper 34. It will readily be appreciated that the sensor member 102 is configured to move into the locked position P8 when subjected to a pressure applied from the connecting collar 22 of the gas cartridge 21 when the gas cartridge 21 is placed or set in the setting position P1 with the collar notch 23 offset from the predetermined correct orientation.

When the sensor member 102 is disposed in the locked position P8, the stopper portion 105*b* of the sensor member 102 can interfere with the end wall 34*a* of the stopper 34. Accordingly, when the gas cartridge 21 is displaced from the setting position P1 toward the loaded position P2, the stopper portion 105*b* of the sensor member 102 comes into abutting engagement with the end wall 34*a* of the stopper 34 and further movement of the sensor member 102 in a direction toward the collar retaining portion 55 is blocked or prevented by the stopper 34. Thus, loading of the gas cartridge 21 into the collar retaining portion 55 is unable to perform as long as the collar notch 23 of the gas cartridge 21 is offset from the predetermined correct orientation.

As described above with reference to FIGS. 11A through 13B, the sensor member 102 having the locking projection 111 and the stopper portion 105*b* is simple in construct but is able to confirm without relying on tedious and time-consuming visual observation that the gas cartridge 21 is placed in the setting position P1 with the collar notch 23 aligned with the predetermined correct orientation. The gas cartridge loading mechanism 20 having such sensor member 102 is relatively simple in construction and compact in size and can be manufactured at a reduced cost.

Figure 14A:
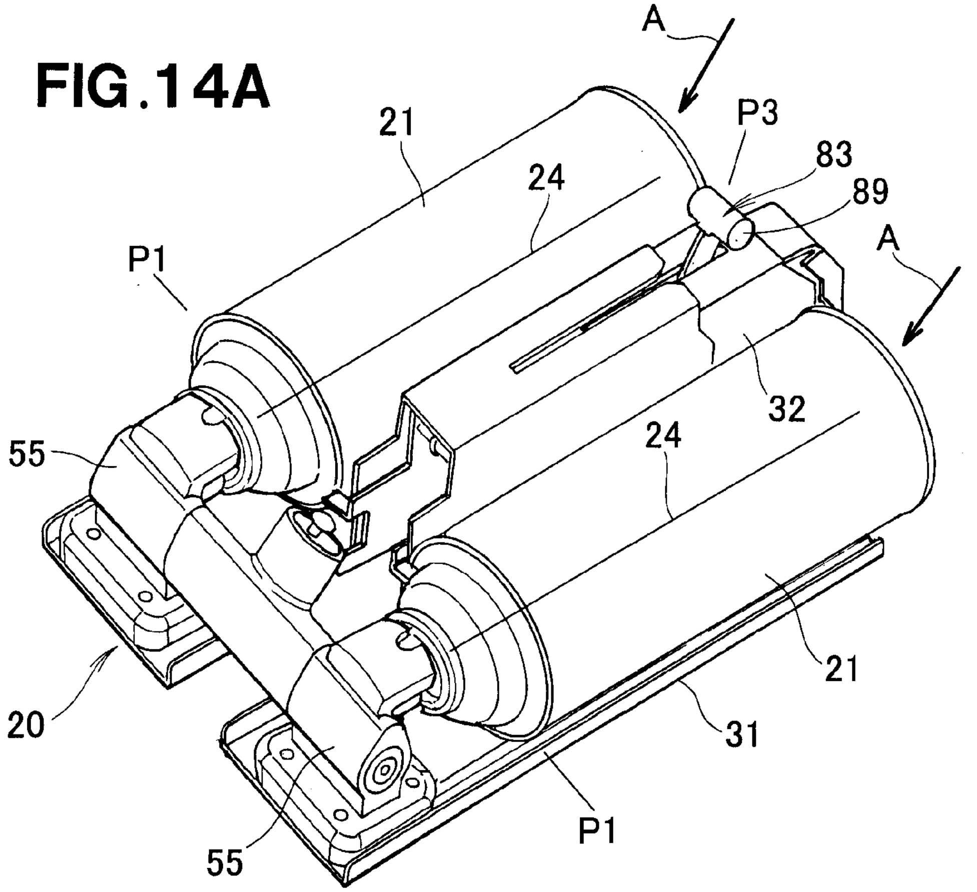
FIG. 14A is a perspective view showing an initial stage of operation of the gas cartridge loading mechanism which is exhibited when the gas cartridges are placed in the setting position with the collar notches aligned with the predetermined correct orientation.

With reference to FIGS. 14A through 17B, description will next be made to a manner in which two gas cartridges 21, 21 are loaded at one time in the collar retaining portions 55 with the collar notch 23 aligned with the predetermined correct orientation. As shown in FIG. 14A, the operation lever 83 is disposed in the releasing position P3 and the gas cartridges 21 are placed or set in the setting positions P1 from a direction of arrows A. In this instance, if each individual gas cartridge 21 is set in the setting position P1 with the collar notch 23 aligned with the predetermined correct orientation, the collar notch 23 is allowed to fit with the positioning projection 111 of the corresponding sensor member 102, as shown in FIG. 14B. By virtue of the fitting engagement between the collar notch 23 and the positioning projection 111, it is possible to prevent the gas cartridge 21 from rotating about its own axis 24 and to retain the gas cartridge 21 in the setting position P1 with the collar notch 23 aligned with the predetermined correct orientation. The gas cartridge 21 is now locked in position against rotation about its own axis 24, and this positional locking will enable the user to detect and confirm that the gas cartridge 21 is placed or set in the setting position P1 with the collar notch 23 aligned with the predetermined correct orientation.

Figure 14B:
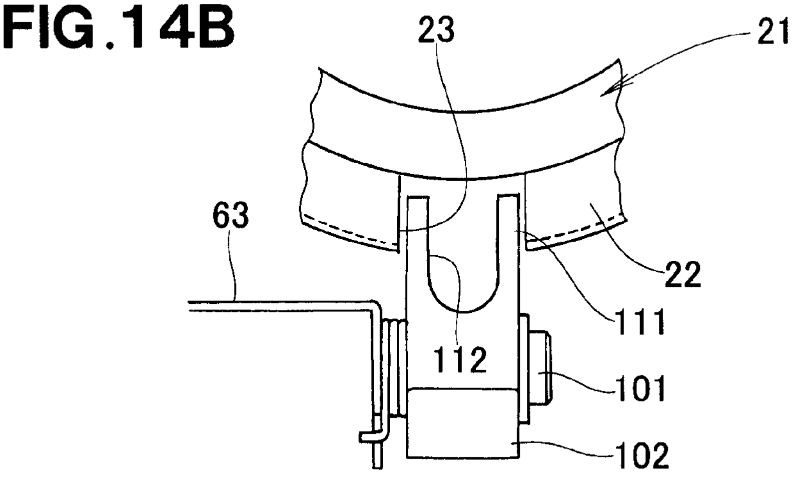
FIG. 14B is an end view showing a sensor member with its positioning projection engaged in the collar notch of the gas cartridge.
Figure 15A:
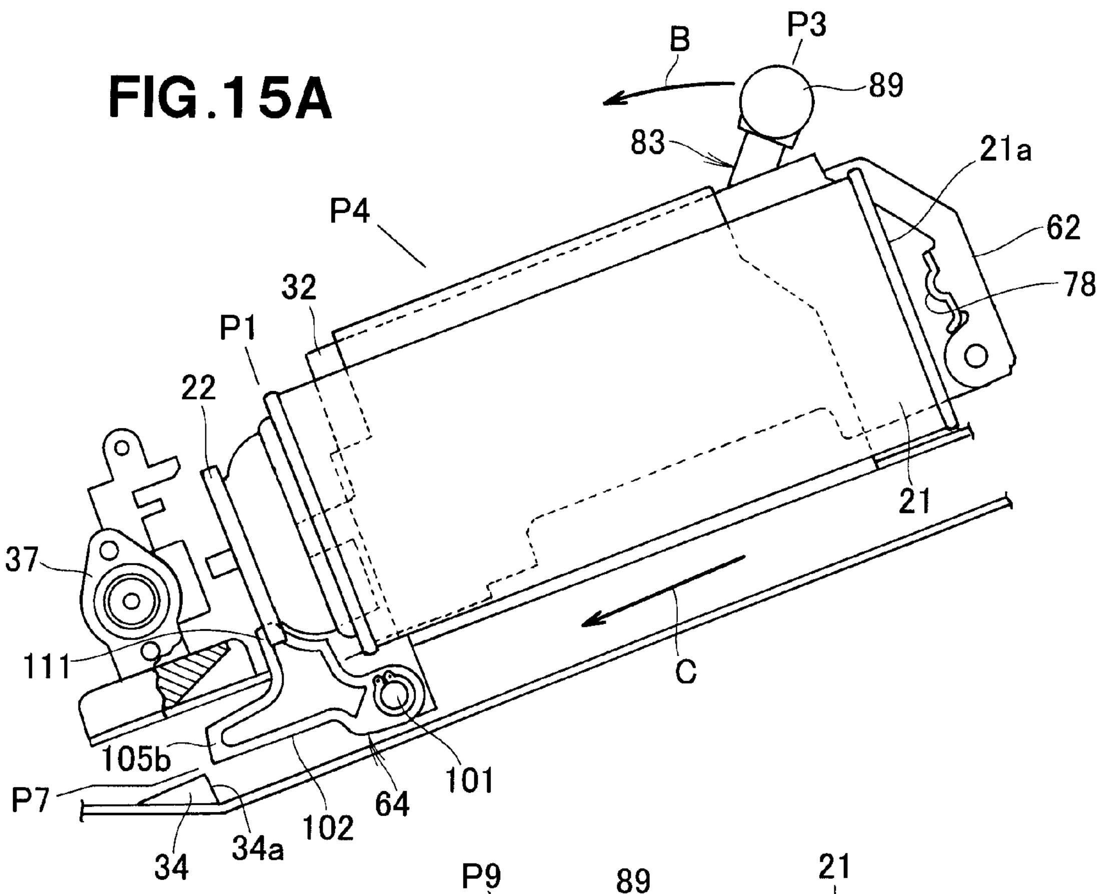
FIG. 15A is a side view illustrative of a manner in which the operation lever of the gas cartridge loading mechanism is about to move from the releasing position toward an intermediate loading position.

With the positioning projection 111 of the sensor member 102 fitted in the collar notch 23 of the gas cartridge 21 as shown in FIG. 14B, the sensor member 102 is allowed to stay in the unlocked position P7 shown in FIG. 15A. In this instance, the stop portion 105*b* of the sensor member 102 is disposed in a position offset upwardly from the end wall 34*a* of the stopper 34 and hence is held out of interference with the stopper 34.

After confirmation that the gas cartridge 21 has been set in the setting position P1 with the collar notch 23 aligned with the predetermined correct orientation, the operation lever 83 is manually displaced from the releasing position P3 in a direction of arrow B toward the loading position P4, thereby causing the slider 32 to undergo sliding movement in a direction of arrow C toward the cartridge retainer portion 37.

With this sliding movement of the slider 32, the cartridge presser member 62 (and more particular each of the presser lugs 78 of the presser member 62) first comes into contact with the bottom wall of 21*a* of the associated gas cartridge 21 and subsequently urges the gas cartridge 21 to move along with the slider 32 in the direction of arrow C.

Figure 15B:
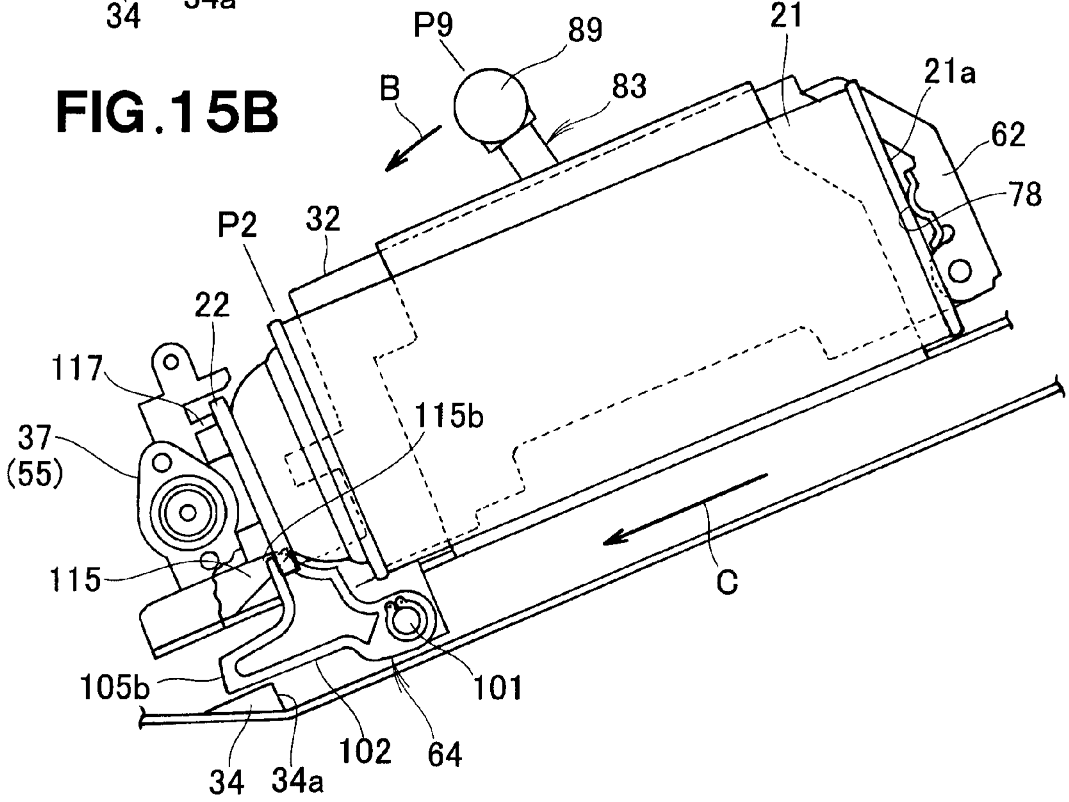
FIG. 15B is a view similar to FIG. 15A, but showing the gas cartridge loading mechanism with the operation lever arrived at the intermediate loading position.

When the operation lever 83 arrives at an intermediate loading position P9 shown in FIG. 15B, the gas cartridge 21 reaches the loaded position P2 whereupon the connecting collar 22 of the gas cartridge 21 comes into abutting engagement with the ring-like retainer wall 117 of the collar retaining portion 55. With this abutting engagement between the connecting collar 22 and the ring-like retainer wall 117, the gas cartridge 21 remains stationary at the loaded position P2 and the connecting collar 22 of the cartridge 21 is loaded in or attached to the collar retaining portion 55 of the cartridge retainer portion 37.

As described above with reference to FIGS. 9 and 10, the anti-rotation prong 115 has a front end portion 115*b* projecting in a direction toward the gas cartridge 21 beyond the end face of the ring-like retainer wall 117 by the distance S, which is equal to a projecting length of the front end portion 115*b*. Accordingly, when the connecting collar 22 of the gas cartridge 21 is loaded in or attached to the collar retaining portion 55 of the cartridge retainer portion 37, as shown in FIG. 15B, the front end portion 115*b* configured to have the projecting length S fits in the engagement groove 112 of the positioning projection 111 of the sensor member 102, as shown in FIG.

16A, and the positioning projection 111 of the sensor member 102 is disposed inside the collar retaining portion 55 (FIG. 15B).

Figure 16A:
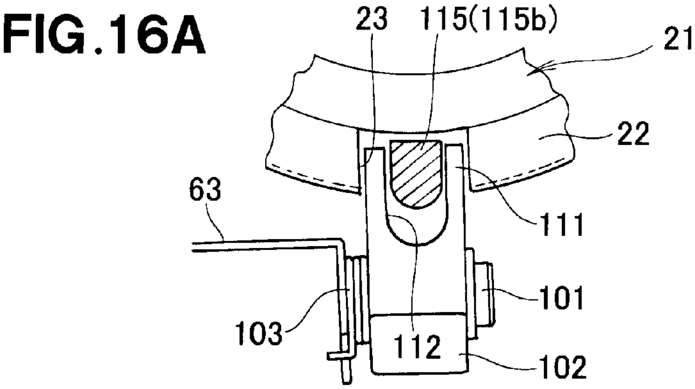
FIG. 16A is an end view showing the anti-rotation prong received in the collar notch of the gas cartridge along with the positioning projection of the sensor member when the operation lever is further displaced to the loading position.
Figure 16B:
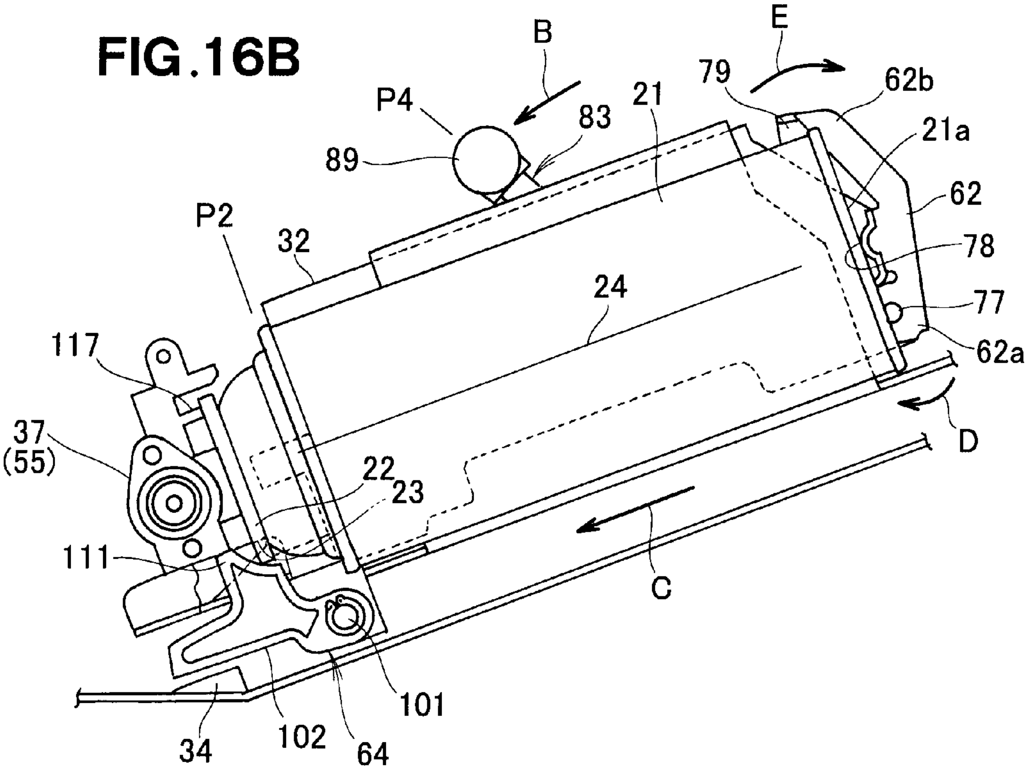
FIG. 16B is a side view showing the gas cartridge loading mechanism with the operation lever disposed in the loading position.

As the operating lever 83 further advances in the direction of arrow C toward the loading position P4, as shown in FIG. 16B, the slider 32 solely continues its sliding movement in the direction of arrow C while the gas cartridge 21 is held stationary at the loaded position P2. With this sliding movement of the slider 32, the support pin 77 is displaced in the direction of arrow C. In this instance, since the upper end portion 62*b* of the cartridge presser member 62 is connected via the retainer projection 79 to the presser spring 86 (FIGS. 5 and 6), and since the presser lug 78 of the cartridge presser member 62 is held in pressure contact with the bottom wall 21*a* of the gas cartridge 21, displacement of the support pin 77 in the direction of arrow C causes the cartridge presser member 62 to turn clockwise about the support pin 77 so that the lower end portion 62*a* of the cartridge presser member 62 moves forward (leftward in FIG. 16B) as indicated by the direction of arrow D, and the upper end portion 62*b* of the cartridge presser member 62 moves backward (rightward in FIG. 16B) as indicated by the direction of arrow E. Due to the backward movement of the upper end portion 62*b* of the cartridge presser portion 62, the presser spring 86 (FIGS. 5 and 6) is stretched and hence is able to produce a greater urging force, which will ensure that the gas cartridge 21 is firmly retained by the cartridge presser member 62.

Continuous sliding movement of the slider 32 in the direction of arrow C is accompanied by movement of the sensor member 102 in the direction of arrow C, which will cause the positioning projection 111 of the sensor member 102 to disengage from the collar notch 23 of the connecting collar 22, as shown in FIG. 16B.

Figure 17A:
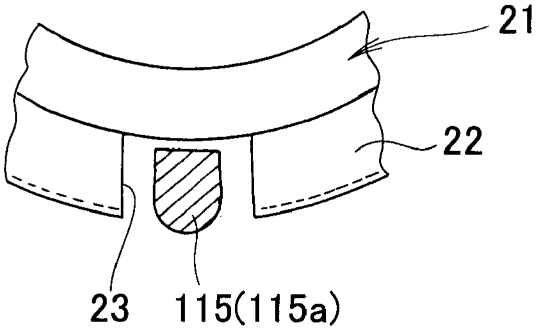
FIG. 17A is an end view showing the anti-rotation prong solely received in the collar notch of the gas cartridge when the gas cartridge is retained in the loaded position.
Figure 17B:
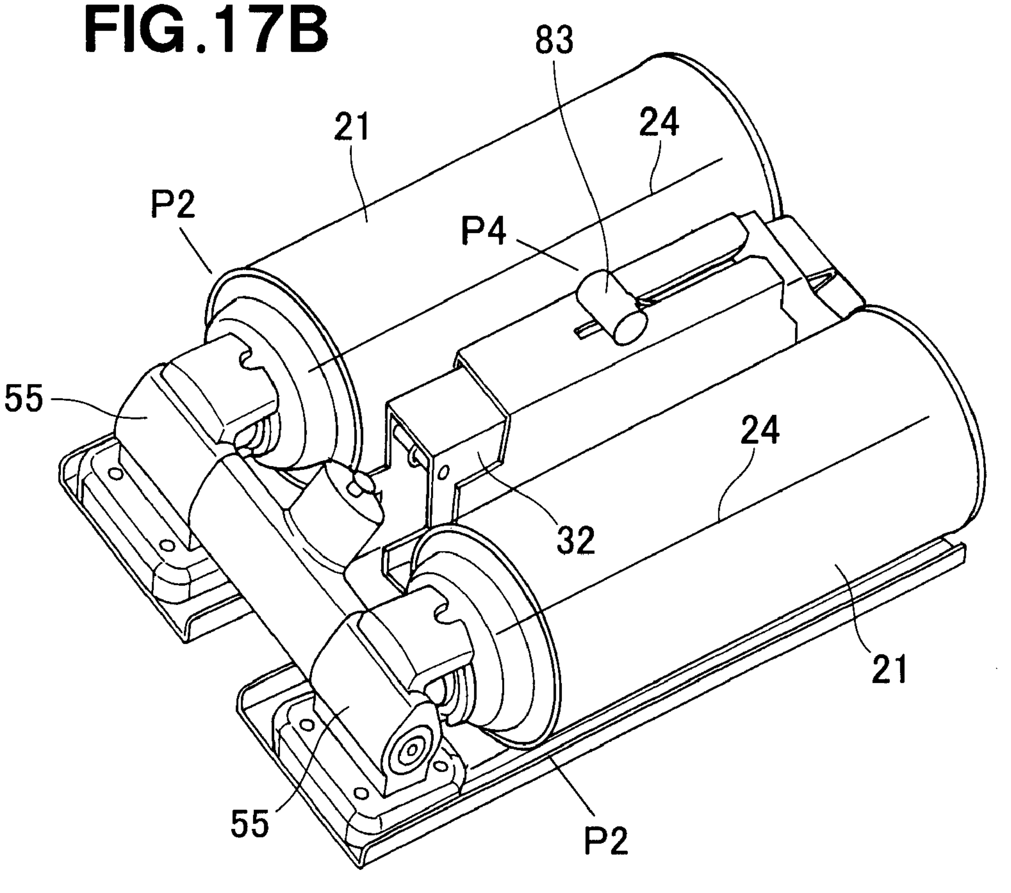
FIG. 17B is a perspective view showing the gas cartridge loading mechanism with the gas cartridges retained in the loaded position.

As shown in FIG. 17A, the front end portion 115*b* of the anti-rotation prong 115 still remains received in the collar notch 23 even after the positioning projection 111 of the sensor member 102 was removed from the collar notch 23 of the gas cartridge 21. The thus arranged anti-rotation prong 115 is ale to prevent the gas cartridge 21 from rotating about its own axis 24 (FIG. 17B). The gas cartridge 21, as it is in the loaded state relative to the collar retaining portion 55, is retained in the loaded position P2 with the collar notch 23 aligned with the predetermined correct orientation.

As described above with reference to FIGS. 14A through 17B, when the gas cartridge 21 is placed or set in the setting position P1 with the collar notch 23 aligned with the predetermined correct orientation, the positioning projection 111 of the sensor member 102 is allowed to fit in the collar notch 23 of the gas cartridge 21 and the sensor member 102 is allowed to stay in the unlocked position P7 in which the stopper portion 105*b* of the sensor member 102 assumes the unlocked position P7 of the sensor member 102. In this instance, since movement of the sensor member 102 in a direction toward the collar retaining portion 55 is not prevented by the end wall 34*a* of the stopper 34, the gas cartridge 21 is allowed to move toward the collar retaining portion 55 in conjunction with sliding movement of the slider 32 until the connecting collar 22 of the gas cartridge 21 is loaded in or attached to the collar retaining portion 55.

By virtue of the fitting engagement between the positioning projection 111 of the sensor member 102 and the collar notch 23 of the gas cartridge 21, the gas cartridge 21 is locked in position against rotation about its own axis 24. With this locking of the gas cartridge 21, the user can readily able to confirm without relying on tedious and time-consuming visual observation that the gas cartridge 21 is placed or set in the setting position P1 with the collar notch 2 aligned with the predetermined correct orientation. The gas cartridge 21 set in the setting position P1 with the collar notch 23 aligned with the predetermined correct orientation is then displaced toward the loaded position P2 during which time fitting engagement between the positioning projection 111 of the sensor member 102 and the collar notch 23 of the gas cartridge 21 is continuously maintained. The thus arranged gas cartridge loading mechanism 20 is able to load or attach the connecting collar 22 of the gas cartridge 21 to the collar retaining portion 55 without requiring tedious and time-consuming visual observation. By virtue of the sensor member 102, the gas cartridge loading mechanism 20 is easy to use.

Figure 18A:
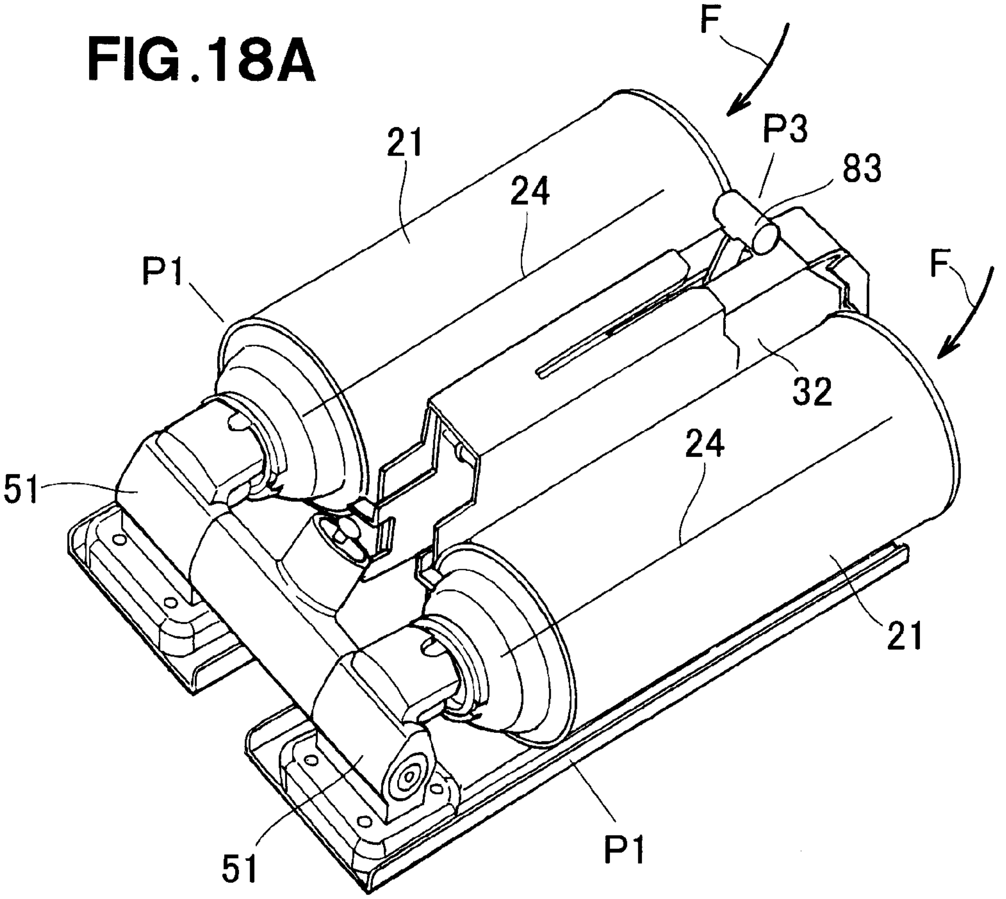
FIG. 18A is a perspective view showing an initial stage of operation of the gas cartridge loading mechanism which may occur when the gas cartridges are placed in the setting position with the collar notches offset from the predetermined correct orientation.
Figure 18B:
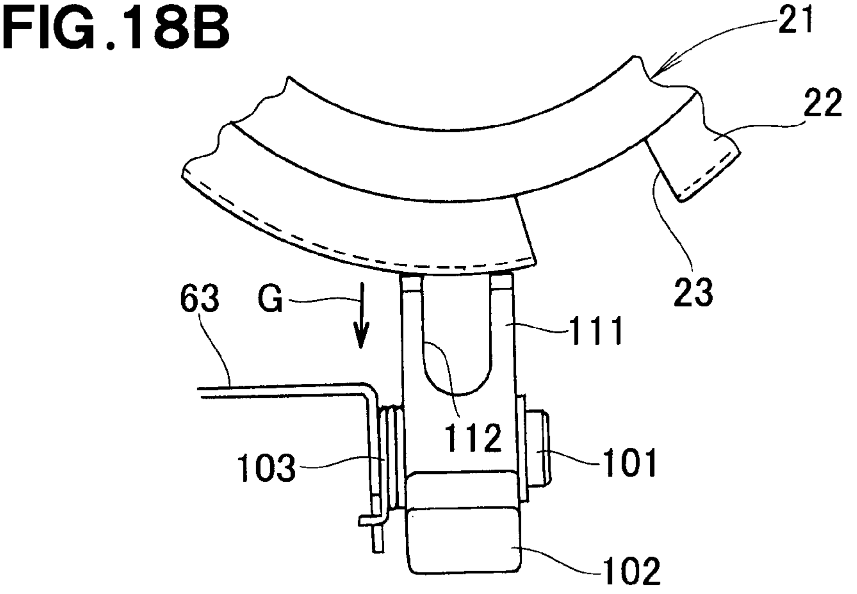
FIG. 18B is an end view showing a manner in which the positioning projection starts descending by the effect of a downward pressure applied from the connecting collar of the gas cartridge when the collar notch is offset from the predetermined correct orientation.
Figure 19:
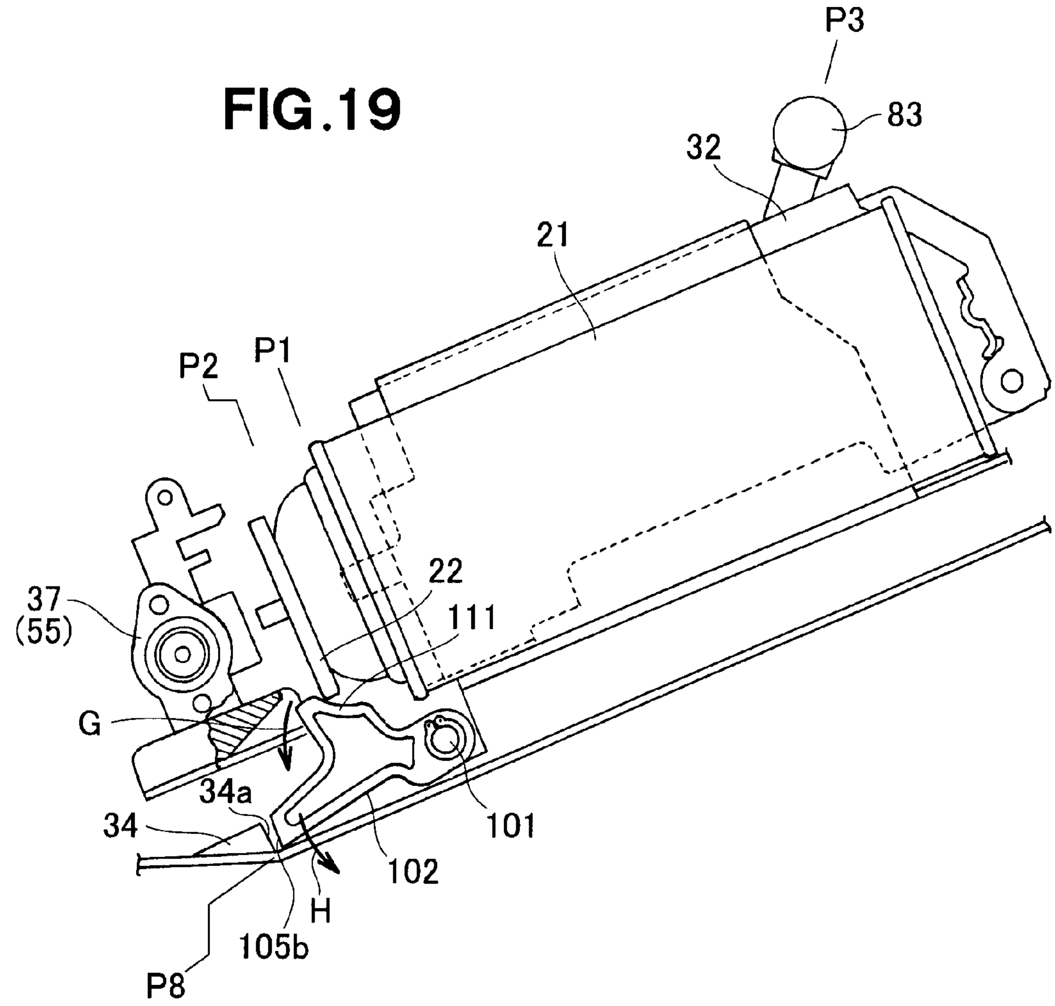
FIG. 19 is a side view illustrative of a manner in which the sensor member disposed in a locked position blocks the gas cartridge from moving from the setting position toward the loaded position as long as the collar notch of the gas cartridge is offset from the predetermined correct orientation.

With reference to FIGS. 18A, 18B and 19, description will next be made to operation of the gas cartridge loading mechanism that may occur when the gas cartridge 21 is placed or set in the setting position P1 with the collar notch 23 offset from the predetermined correct orientation. As shown in FIG. 18A, the operation lever 83 is disposed in the releasing position P3 and each individual gas cartridge 21 is placed or set in the setting position P1 from the direction of arrow F.

In this instance, if the gas cartridge 21 is set in the setting position P1 with the collar notch 23 offset from the predetermined correct orientation, as shown in FIG. 18B, the positioning projection 111 of the sensor member 102 is first brought into contact with the connecting collar 22 of the gas cartridge 21 and then subjected to a downward pressure of the connecting collar 22 whereupon the positioning projection 111 starts descending in the direction of arrow G by the effect of the downward pressure applied from the connecting collar 23. With this descending movement of the positioning projection 111, the sensor member 102 is turned counterclockwise about the support pin 101, as indicated by the direction of arrow H shown in FIG. 19 and eventually displaced in the locked position P8 where the stopper portion 105*b* of the sensor member 102 can interfere with the end wall 34*a* of the stopper 34 when the gas cartridge 21 is displaced from the setting position P1 toward the loaded position P2.

By thus blocking forward movement of the sensor member 102 by the stopper 34, the gas cartridge 21 can never reach the loaded position P2 and loading of the connecting collar 22 into the collar retaining portion 55 does never occur as long as the gas cartridge 21 is set in the setting position P2 with the collar notch 23 offset from the predetermined correct orientation.

Referring back to FIG. 18A, the gas cartridges 21 are rotated about their own axes until the collar notches 23 aligned with the predetermined correct orientation where the collar notch 23 is allowed to fit with the positioning projection 111 of the sensor member 102, as shown in FIG. 14B. The gas cartridges 21 are now set in the setting position P1 with the collar notches 23 aligned with the predetermined orientation and hence can be loaded in the collar retaining portions by conducting a sequence of operations shown in FIGS. 15A through 17B.

As described above with reference to FIGS. 18A, 18B and 19, when the gas cartridge 21 is placed or set in the setting position P1 with the collar notch 23 offset from the predetermined correct orientation, the sensor member 102 is displaced to the locked position P8 by the effect of a downward pressure applied from the connecting collar 22 to the positioning projection 111. While the sensor member 102 is disposed in the locked position P8, movement of the sensor member 102 in a direction toward the collar retaining portion 55 is blocked by the end wall 34*a* of the stopper 34, and the gas cartridge 21 is now unable to move from the setting position P1 to the loaded position P2 even when an attempt is made to displace the operation lever 83 from the leasing position P3 toward the loading position P4 (FIG. 16B). Thus, loading of the connecting collar 22 of the gas cartridge 21 into the collar retaining portion 55 is impossible to achieve as long as the gas cartridge 21 is placed or set in the setting position P1 with the collar notch 23 offset from the predetermined correct orientation.

The present has been described and disclosed in conjunction with an embodiment in which the inventive gas cartridge loading mechanism 20 is incorporated in the gas engine-driven portable generator 10. The gas cartridge loading mechanism according to the present invention may be used with other gas propellant working machines such as gas engine-driven tillers.

Although in the illustrated embodiment, the gas cartridge 21 is loaded in the collar retaining portion 55 by using the base 31, the slider 32 and the operation mechanism 33, the gas cartridge 21 may be manually loaded in the collar retaining portion 55 by a human operator. Furthermore, the base 31, the slider 32 and the operation mechanism 33 may be replaced with any other suitable means or device. Those parts, which include the gas cartridge 21, connecting collar 22, collar notch 23, base 31, slider 32, operation mechanism 33, stopper 34, end wall 34*a* of the stopper 34, collar retaining portion 55, sensor means or assembly 64, sensor member 102, positioning projection 111, stopper portion 105*b*, anti-rotation prong 115, and front end portion 115*b* of the anti-rotation prong 115, may be changed or modified in terms of shape and configuration.

The present invention is particularly useful when embodied in a gas cartridge loading mechanism incorporated in a gas propellant working machine for loading a gas cartridge into a collar retaining portion by displacing the gas cartridge toward the collar retaining portion.

Obviously, various minor changes and modifications of the present invention are possible in light of the above teaching. It is therefore to be understood that within the scope of the appended claims the invention may be practiced otherwise than as specifically described.

What is claimed is:

1. A gas cartridge loading mechanism for attaching a connecting collar of a gas cartridge to a collar retaining portion by displacing the gas cartridge toward the collar retaining portion, the gas cartridge loading mechanism comprising:

a sensor member movable along with the gas cartridge in a direction toward the collar retaining portion, the sensor member being mounted to undergo pivotal movement between a locked position and an unlocked position; and a stopper configured to prevent the sensor member from moving in the direction toward the collar retaining portion beyond the stopper when the sensor member is disposed in the locked position, and to allow the sensor member to move in the direction toward the collar retaining portion beyond the stopper when the sensor member is disposed in the unlocked position, wherein the sensor member is configured to move into the locked position when subjected to a pressure of the connecting collar when the gas cartridge is placed in a setting position with a collar notch in the connecting collar offset from a predetermined correct orientation, and to engage with the collar notch of the connecting collar and remain in the unlocked position when the gas cartridge is placed in the setting position with the collar notch aligned with the predetermined correct orientation.

2. The gas cartridge loading mechanism according to claim 1, wherein the sensor member includes a positioning projection configured to fit in the collar notch of the connecting collar when the gas cartridge is placed in the setting position with the collar notch aligned with the predetermined correct orientation, and to engage with the connecting collar and receive the pressure of the connecting collar when the gas cartridge is placed in the setting position with the collar notch offset from the predetermined correct orientation, and a stopper portion configured to assume the unlocked position when the collar notch of the connecting collar is engaged with the positioning projection of the sensor member, and to assume the locked position when the positioning projection is subjected to the pressure of the connecting collar of the gas cartridge.

3. The gas cartridge loading mechanism according to claim 2, further comprising an anti-rotation prong disposed on the collar retaining portion and receivable in the collar notch of the connecting collar to prevent the gas cartridge from rotating about an axis of the gas cartridge when the connecting collar is attached to the collar retaining portion.

4. The gas cartridge loading mechanism according to claim 3, wherein the positioning projection has an engagement groove for receiving therein the anti-rotation prong when the connecting collar is attached to the collar retaining portion.

* * * * *